(12) United States Patent
Aweya et al.

(10) Patent No.: US 7,336,611 B1
(45) Date of Patent: *Feb. 26, 2008

(54) RATE-BASED MULTI-LEVEL ACTIVE QUEUE MANAGEMENT WITH DROP PRECEDENCE DIFFERENTIATION

(75) Inventors: James Aweya, Kanata (CA); Michel Ouellette, Plantagenet (CA); Delfin Montuno, Kanata (CA); Kent Felske, Kanata (CA)

(73) Assignee: Nortel Networks Limited, St. Laurent, Ontario (CA)

( * ) Notice: Subject to any disclaimer, the term of this patent is extended or adjusted under 35 U.S.C. 154(b) by 924 days.

This patent is subject to a terminal disclaimer.

(21) Appl. No.: 10/633,459

(22) Filed: Aug. 1, 2003

Related U.S. Application Data

(63) Continuation-in-part of application No. 10/426,763, filed on Apr. 30, 2003, and a continuation-in-part of application No. 10/426,286, filed on Apr. 30, 2003, and a continuation-in-part of application No. 10/426,289, filed on Apr. 30, 2003.

(51) Int. Cl.
    *H04J 1/16* (2006.01)
(52) U.S. Cl. ............................. 370/235; 370/253
(58) Field of Classification Search .......... 370/229, 370/230, 231
    See application file for complete search history.

(56) References Cited

U.S. PATENT DOCUMENTS 6,690,645 B1 * 2/2004 Aweya et al. ............ 370/230

6,901,593 B2 * 5/2005 Aweya et al. ............ 718/104

OTHER PUBLICATIONS

Aweya et al., Rated-based multi-level active queue management with drop precedence differentiation, U.S. Appl. No. 10/426,763.*
Aweya et al., Rated-based multi-level active queue management with drop precedence differentiation, U.S. Appl. No. 10/426,286.*
Aweya et al., Rated-based multi-level active queue management with drop precedence differentiation, U.S. Appl. No. 10/426,289.*
Aweya, J. et al., "A Control Theoretic Approach to Active Queue Management," *Computer Networks*, vol. 36, Issue 2-3, Jul. 2001, pp. 203-235.

(Continued)

*Primary Examiner*—Ricky Q. Ngo
*Assistant Examiner*—Kan Yuen
(74) *Attorney, Agent, or Firm*—Ridout & Maybee LLP

(57) ABSTRACT

Disclosed is a rate-based multi-level Active Queue Management with drop precedence differentiation method and apparatus which uses traffic rate information for congestion control. Using a nonlinear fluid-flow model of Traffic Control Protocol, an integral controller in a closed-loop configuration with gain settings characterized for stable operation allows a matching of the aggregate rate of the active TCP connections to the available capacity. Further disclosed is a method for calculation of the regime of gains over which stable operation of a given network obtains. An enhancement of the basic algorithm provides the ability to drop low-precedence packets in preference to higher precedence packets. This approach allows for a rate-based AQM approach for application in a differentiated service environment.

17 Claims, 13 Drawing Sheets

OTHER PUBLICATIONS

Braden, D. et al., "Recommendation on Queue Management and Congestion Avoidance in the Internet," *IETF RFC 2309*, Apr. 1998.

Chait, Y et al., "Fixed and Adaptive Model-Based Controllers for Active Queue Management," *Proc. American Control Conf.*, Arlington, VA, Jun. 25-27, 2001, pp. 2981-2986.

Cnodder, S.D. et al. "A Rate Based Red Mechanism," *Proc. NOSSDAV 2000*, Chapel Hill, North Carolina, Jun. 26-28, 2000, pp. 602-609.

Feng, W. et al., "A Self-Configuring RED," *Proc. IEEE INFOCOM'99*, 1999, pp. 1320-1328.

Feng, W. et al., "BLUE: A New Class of Active Queue Management Algorithms", *Technical Report* CSE-TR-387-99, Dept. of EECS, University of Michigan, Apr. 1999.

Floyd, S. et al., "Random Early Detection Gateway for Congestion Avoidance," *IEEE/ACM Trans. Networking*, vol. 1, No. 4, Aug. 1993, pp. 397-413.

Heinanen, J. et al., "Assured Forwarding PHB Group," *IETF RFC 2597*, Feb. 1999.

Hollot, C.V. et al., "A Control Theoretic Analysis of RED," *Proc. IEEE INFOCOM 2001*, 2001, pp. 1510-1519.

Hollot, C.V. et al., "On Designing Improved Controllers for AQM Routers Supporting TCP Flows," *Proc. IEEE INFOCOM 2001*, 2001, pp. 1726-1734.

Jacobson, V. et al., "An Expedited Forwarding PHB," IETF RFC 2598, Jun. 1999.

Kharitonov, V.L. et al., "Robust Stability of Time-delay Systems," *IEEE Trans. Automatic Control*, vol. 39, No. 12, Dec. 1994, pp. 2388-2397.

Kunniyur, S. et al., "End-to-end Congestion Control: Utility Functions, Random Losses and ECN Marks," *Proc. IEEE INFOCOM'2000*, Tel Aviv, Israel, Mar. 2000, pp. 1323-1332.

Misra, V. et al., "Fluid-based Analysis of a Network of AQM Routers Supporting TCP Flows with an Application to RED," *Proc. ACM SIGCOMM 2000*, 2000, pp. 151-160.

Morris, R. et al., "Scalable TCP Congestion Control," *Proc. IEEE INFOCOM 2000*, pp. 1176-1183.

Nichols, K. et al., "Definition of the Differentiated Services Field (DS Field) in the IPv4 and IPv6 Headers," *IETF RFC 2474*, Dec. 1998.

Ott, T.J. et al., "SRED: Stabilized RED", *Proc. IEEE INFOCOM'99*, NY, Mar. 21-25, 1999, pp. 1346-1355.

Silva, G.J. et al., "New Results on the Synthesis of PID Controllers," *IEEE Trans. Automatic Control*, vol. 47, No. 2, Feb. 2002, pp. 241-252.

Silva, G.J. et al., "Stabilization of Time Delay Systems," *Proc. American Control Conf.*, Chicago, Illinois, Jun. 2000, pp. 963-970.

Su, L. et al., "An Active Queue Management Scheme for Internet Congestion Control and its Application to Differentiated Services," *Proc. ICCCN 2000*, Las Vegas, Nevada, Oct. 2000, pp. 62-68.

Villamizar, C. et al., "High Performance TCP in ANSNET," *ACM Computer Commun. Rev.*, vol. 24, No. 5, Oct. 1995.

* cited by examiner

RATE-BASED MULTI-LEVEL ACTIVE QUEUE MANAGEMENT WITH DROP PRECEDENCE DIFFERENTIATION

RELATED U.S. APPLICATION DATA

This patent application is a continuation-in-part application of U.S. patent application Ser. No. 10/426,763 filed Apr. 30, 2003; U.S. patent application Ser. No. 10/426,286 filed Apr. 30, 2003; and U.S. patent application Ser. No. 10/426,289 filed Apr. 30, 2003, the contents of which are hereby incorporated by reference.

FIELD OF THE INVENTION

The present invention relates generally to network queue management and, more particularly, to a technique for rate-based multi-level active queue management with drop precedence differentiation.

BACKGROUND OF THE INVENTION

The networking community is currently seeking mechanisms which will enable networks to provide service differentiation based on application and user needs while simultaneously managing congestion.

Congestion control in the Internet has primarily been the responsibility of the end-to-end congestion control mechanisms of TCP (Transmission Control Protocol). However, with the rapid growth of the Internet and the stringent requirements for quality of service (QoS) support, it has become clear that the Internet could not exclusively rely on the end hosts to preform the end-to-end congestion control. Mechanisms are needed in the intermediate network elements to complement the end hosts congestion control mechanisms. Recognizing this, the Internet Engineering Task Force (IETF) has advocated the deployment of active queue management (AQM) mechanisms at the intermediate network elements (routers, switches, etc.) as a means of congestion control.

To perform AQM, the network elements are equipped with the means to detect incipient congestion and to signal the traffic sources before congestion actually occurs. AQM mechanisms allow the network elements to send explicit/ implicit feedback of congestion to the end hosts by marking/ dropping packets. The end hosts in turn react to the packet marking/dropping by reducing their data transmission rates. The main goals of AQM are to reduce the average queue lengths in the network elements and thereby decrease the end-to-end delay experienced by end user traffic, and maximize the utilization of network resources by reducing the packet loss that occurs when queues overflow.

The current Internet and most private corporate networks offer best-effort service to traffic. In this model, all user packets compete equally for network resources. The best-effort service model has been sufficient until recently when usage and popularity of IP networks (e.g., the Internet) soared. This rise in usage and popularity has been paralleled by a rise in user expectation regarding the type of applications and quality of service offered by these networks. The networking community has recognized the importance of simplicity in packet forwarding mechanisms, but also the inadequacy of the best-effort service model in supporting the wide range of applications and user requirements. Different applications and users are increasingly demanding different quality of service (QoS) and network usage rates.

To address these new demands, the IETF has been looking at a number of architectural enhancements to enable networks to provide service differentiation based on application and user needs. One of these efforts has resulted in the differentiated services (DiffServ) architecture (as described in K. Nichols, S. Blake, F. Baker, and D. Black, "Definition of the Differentiated Services Field (DS Field) in the IPv4 and IPv6 Headers," IETF RFC 2474, Dec. 1998; and in S. Blake, D. Black, M. Carlson, E. Davies, Z. Wang, W. Weiss, "An Architecture for Differentiated Service," IETF RFC 2475, Dec. 1998).

DiffServ aims to provide a scalable framework for supporting various levels of service to different users and the pricing of such services. It is an approach to service level specifications in IP networks based on traffic conditioning at the network edge and differentiated forwarding of aggregated traffic flows at the network core. The underlying goal of the DiffServ architecture is to address the scalability issue regarding per-flow service differentiation in the core of the network. In DiffServ, the core network elements do not necessarily have to implement complex resource reservation, scheduling, processing, and classification mechanisms in addition to maintaining state information for each individual traffic flow. The architecture allows network designers to push most of the state and forwarding complexity to the edge of the network.

In DiffServ, a distinction is made between boundary and interior nodes. Boundary nodes classify incoming traffic into a small number of aggregate flows according to their diverse QoS requirements such as bandwidth, delay, and packet drop precedence. Once the traffic enters the network, interior nodes deal only with the aggregated traffic. A DiffServ domain refers to a contiguous set of nodes operating with a common set of service provisioning policies and per-hop-behavior (PHB) definitions. Per-domain services are realized by traffic conditioning at the edge and simple differentiated forwarding at the core of the network. Packets are marked with the appropriate DiffServ code point (DSCP) at the edge of the network and within the core of the network, the network nodes (routers, switches, etc.) simply forward packets based on the PHB associated with the DSCP. An end-to-end differentiated service is obtained by concatenation of per-DiffServ domain services.

Two forwarding mechanisms recently standardized by the IETF are Expedited Forwarding (EF) PHB and Assured Forwarding (AF) PHB. The purpose of the EF PHB is to support low loss, low latency, low jitter, assured bandwidth, end-to-end premium service. These services can be used to support delay sensitive traffic requiring high service guarantees. In order to provide the necessary assurance, sufficient network resources need to be reserved. The EF PHB provides a point-to-point connection or a "virtual leased line" type of service. The AF PHB standard specifies four classes and three levels of drop precedence per class. Packets entering the network are classified as belonging to one of these four traffic classes. The three drop precedence levels (from high to low priority) are also referred in terms of color as green (DP0), yellow (DP1), and red (DP2). In case of congestion, an AF-compliant DiffServ node drops low precedence (red) packets in preference to higher precedence (green, yellow) packets. The AF PHB group is intended to provide a flexible, low-cost support for a wide range of traffic needs.

The AF drop precedence levels (or colors) are implemented using an active queue management (AQM) algorithm in the network nodes. AQM has been proposed in B. Braden, et al, "Recommendation on Queue Management and Congestion Avoidance in the Internet," IETF RFC 2309, Apr. 1998, as a means to provide some congestion control as well as some notion of QoS to users.

One important class of AQM is based on randomized packet dropping or marking. With this form of AQM, a network node drops each arriving packet with a certain probability, where the exact probability is a function of the average queue size or any suitable indicator of network congestion such as rate mismatch at a node. The idea behind AQM is to detect incipient congestion early and convey congestion notification to the end-hosts, allowing them to back off before queue overflow and sustained packet loss occur. The AQM algorithm has to detect and respond to long-term congestion by discarding or marking packets. Very small buffers tend to complicate the control problem in this case as the short queues more easily overflow and do not provide adequate information for process control.

In view of the foregoing, it would be desirable to provide a technique for network queue management which overcomes the above-described inadequacies and shortcomings by providing a mechanism which does not react to short-term burst traffic and allows each precedence level to be addressed differently. During long-term congestion the highest priority traffic should receive the lowest discard rate whereas the lowest priority traffic should receive the highest discard rate.

SUMMARY OF THE INVENTION

An object of the present invention is to provide a mechanism for improved rate-based multi-level active queue management with drop precedence differentiation.

According to an aspect of the invention, there is provided a method for controlling a data flow in a data network, starting with setting a stable integral controller gain $k_i$. Next specifying a plurality of precedence grades, each of the precedence grades has an associated priority. Then, for each precedence grad measuring a cumulative data arrival rate $R(n)$ at time n, where $R(n)$ is the sum of the data arrival rates for a particular precedence grade under consideration plus the data arrival rates of all precedence grades with a higher priority than the particular precedence grade under consideration. Next, there is calculated for each precedence grade a normalized error signal $e(n)$, according to the relation $e(n)=(T(n)-R(n))/x$, where $T(n)$ is a capacity at time n, and x is a nominal packet size. Following this, there is computed for each precedence grade a mark/drop probability $p(n)$ according to the relation $$p(n)=\min\{\max\;[p(n-1)+k_i\cdot\Delta t\cdot e(n),\;0],\;\rho_{max}\}$$

where $\Delta t$ is the time interval between a $(n-1)^{th}$ and the $n^{th}$ computation, and $0<\rho_{max}\leq 1$; and, subsequently, for each precedence grade executing a packet mark/drop routine based upon the calculated mark/drop probability $p(n)$.

Conveniently, the data arrival rate may be filtered by use of an exponentially weighed moving average scheme according to the relation:

$$R_c'(n)=(1-\beta)\cdot R_c'(n-1)+\beta\cdot R_c(n)$$

where $\beta$ is a filter gain parameter such that $0<\beta<1$, $R_c'(n-1)$ is the filtered data arrival rate at time n−1, $R_c'(n)$ is the desired filtered data arrival rate at time n, and $R_c(n)$ is the cumulative data arrival rate at time n.

According to another aspect of the invention, preceding the packet/mark drop routine may be a bypassing routine involving the steps of testing the cumulative data arrival rate $R_c(n)$ for each precedence grade against a rate threshold $T_L$ specific to that precedence grade, and if the data arrival rate $R(n)$ is below or equal to the rate threshold $T_L$ then bypassing the step of executing a packet mark/drop routine.

Conveniently, the packet mark/drop routine may be realized according to a random number generator mark/drop scheme.

The stable integral controller gain may be chosen from a pre-calculated regime of stable gains. A method for pre-calculating the regime may be as follows: starting with (1) obtaining for said network a value for said network a set of parameters k, $d_0$, and $\tau$, where k is a steady-state gain of said network, $d_0$ is a time delay of said network, and $\tau$ is a time constant of said network. Next step (2) determining the root $z_1$ in the interval $$\left(0,\frac{\pi}{2}\right)\;\text{of}\;\cot(z_1)=\frac{\tau}{d_0}z_1,$$

and then computing the range of stable gains for $k_i$ for this particular network as:

$$-\frac{\tau}{kd_0^2}z_1\sqrt{z_1^2+\frac{d_0^2}{\tau^2}}\;<k_i<0.$$

In accordance with another other aspect of the present invention, there is provided an apparatus for rate-based multi-level active queue management with drop precedence differentiation, the apparatus being configured according to the methods described above.

In accordance with another other aspect of the present invention, there is provided an apparatus for controlling a data flow in a data network. The apparatus has an integral controller having an integral controller gain $k_i$ setting for which the said network is stable, and a cumulative data rate calculator for calculating a cumulative data arrival rate $R(n)$ associated with each of said plurality of precedence grades, wherein $R(n)$ is the sum of the data arrival rates for a particular precedence grade under consideration plus the data arrival rates of all precedence grades with a higher priority than said particular precedence grade under consideration. The apparatus further contains an error signal calculator for calculating a normalized error signal $e(n)$ for each of said plurality of precedence grades according to the relation $$e(n)=(T(n)-R(n))/x,$$

where $T(n)$ is an assigned precedence grade capacity at time n, and x is a nominal packet size. Further, the apparatus has a mark/drop probability processor for computing a mark/drop probability $p(n)$ for each of said plurality of precedence grades according to the relation $$p(n)=\min\{\max[p(n-1)+k_i\cdot\Delta t\cdot e(n),\;0],\;\rho_{max}\}$$

where $\Delta t$ is the time interval between a $(n-1)^{th}$ and the $n^{th}$ computation, and $0<\rho_{max}\leq 1$; and a packet mark/drop module for executing a packet mark/drop routine based upon the calculated mark/drop probability $p(n)$.

In accordance with another other aspect of the present invention, there is provided an article of manufacture carrying instructions for a method for rate-based multi-level active queue management with drop precedence differentiation in a data network and, further, there is provided a signal embodied in a carrier wave representing instructions for a method for rate-based multi-level active queue management with drop precedence differentiation in a data network according to an integral control scheme.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

BRIEF DESCRIPTION OF THE DRAWINGS

The invention will be further understood from the following detailed description of embodiments of the invention and accompanying drawings in which.

DETAILED DESCRIPTION

The description that follows describes a rate-based AQM scheme which matches the aggregate rate of the active TCP connections to the specified available capacity while maintaining minimal queue size and high-link utilization. Following the description of the basic mechanism, an enhanced version is described which details an embodiment which allows for precedence grade differentiation.

Figure 1:
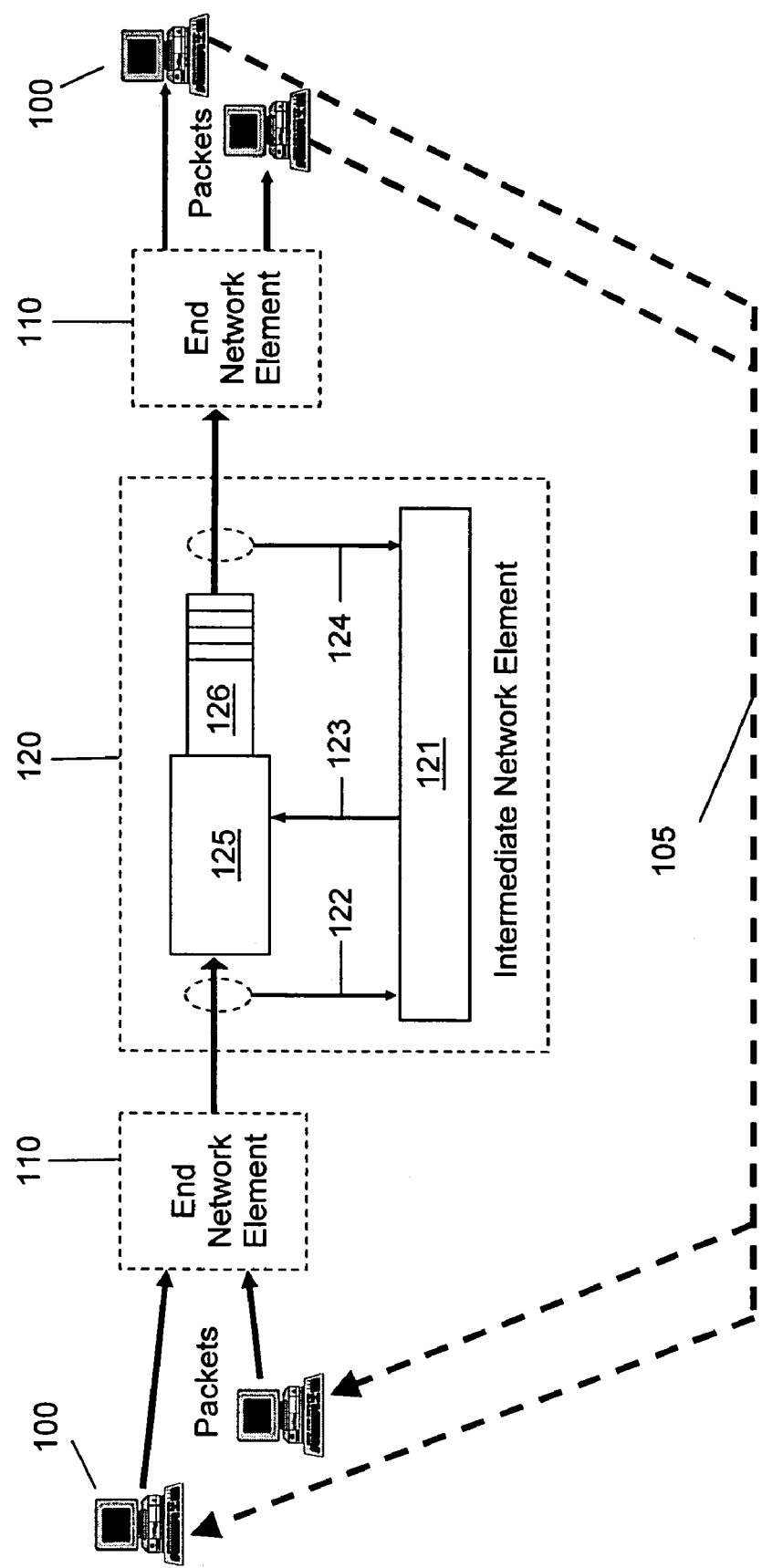
FIG. 1 is a diagram of an Active Queue Management controller in an Intermediate Network Element according to an embodiment of the invention.

A high-level depiction of an implementation of the active queue management integral control scheme according to a possible embodiment is given in FIG. 1.

Users 100 communicate with End Network Elements 110 which pass packet data either directly or through Intermediate Network Elements 120 to other End Network Elements 110. End-to-end congestion control mechanisms under normal TCP rely upon Implicit/Explicit Feedback Signals 105. Examples of Implicit/Explicit Feedback Signals 105 typically include duplicate TCP acknowledgement packets, timeouts, and marked packets.

In order to meet the stringent requirements for Quality of Service (QoS) of users and the increases in data volume with the rapid growth of the Internet, it is advantageous to provide congestion control mechanisms at intermediate points to complement the end hosts' congestion control mechanisms. According to one aspect of the invention, Intermediate Network Element 120 has been equipped with such a mechanism for congestion control.

Within Intermediate Network Element 120 are a Integral Controller 121, a queue means 126, an arrival rate measurement means 122, a target rate measurement means 124, a packet mark/drop module 125, and a mark/drop probability control means 123 by which the Integral Controller 121 influences the packet mark/drop module 125 according to a scheme described hereafter.

Figure 2:
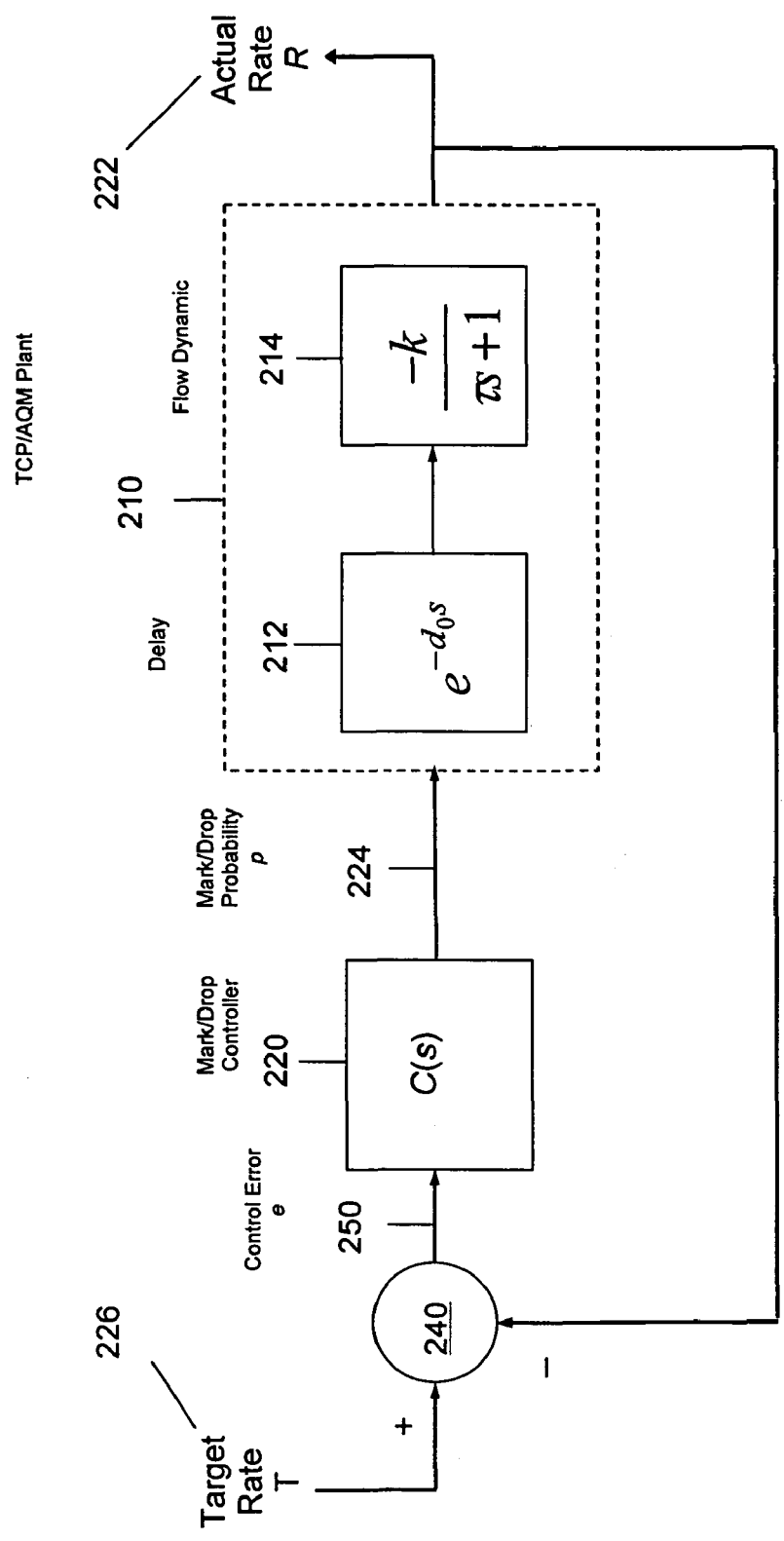
FIG. 2 is a diagram of a closed-loop control system according to an embodiment of the invention.

A control system oriented depiction of the system of FIG. 1 may be seen in FIG. 2 where the closed-loop system is represented as having two main elements: TCP/AQM plant 210 and the control-function means 220. The control system functions by comparing a desired Target Rate "T" 226 with an Actual Rate "R" 222 via a summer 240 which generates a control error "e" 250 by determining the difference between the two rates. This difference is used as an input to the control-function means 220 which generates a mark/drop probability threshold "p" 224. Changes in the threshold for marking/dropping packets results in an eventual change in the Actual Rate "R" 222 as the effects propagate through the system. As with all closed-loop systems, the control-function means 220 must have a control function response chosen so as to render a stable closed-loop system response. If this condition is not met, the resultant performance will be deleterious to the network operation, possibly to the point of causing performance degradation.

In order to be able to determine the stability requirements for the control-function means, the open-loop transfer function for TCP/AQM plant 210 must be established. This may be done as follows.

A simplified rate-based fluid-flow model of a TCP source i assessing a single link is described by the following nonlinear differential equation:

$$\dot{r}_i(t) = \frac{1}{d_i^2(t)} - \theta r_i(t) r_i(t - d_i(t)) p(t - d_i(t)) \quad (1)$$

where $\dot{r}$ denotes the time derivative of r, $r_i$ is rate of the TCP source (in packets per second), $d_i$ is the round-trip time (RTT) of the TCP source (in seconds), p is the dropping probability of a TCP packet at the link, and $\theta$ is a parameter characteristic of the type of TCP source. This simplified model of TCP ignores the slow-start and the timeout behavior of TCP. Note that $r_i$ and p are bounded, respectively, as follows: $r_i \in [0,C]$, $p \in [0,1]$, where C is the link capacity.

Denoting $p_0$ as the steady-state (or operating point) of the dropping probability of a TCP source and assuming a constant RTT $d_0$, the steady-state throughput $r_0$ can be obtained as:

$$0 = \frac{1}{d_0^2} - \theta r_0^2 p_0 \text{ or } r_0 = \frac{1}{d_0}\sqrt{\frac{1}{\theta p_0}}.$$

If the parameter θ takes on the value of ⅔, the steady-state throughput of TCP is obtained as:

$$r_0 = \frac{1}{d_0}\sqrt{\frac{3}{2p_0}}.$$

Making the approximation relating data transmission rate and window size $$r_i(t) \approx \frac{W_i(t)}{d_i(t)},$$

and assuming $d_i(t)=d_i$=constant, it obtains that:

$$\dot{r}_i(t) \approx \frac{d}{dt}\left(\frac{W_i(t)}{d_i(t)}\right) = \frac{1}{d_i}\frac{dW_i(t)}{dt} - \frac{W_i(t)}{d_i^2}\frac{dd_i}{dt} \approx \frac{1}{d_i}\frac{dW_i(t)}{dt}.$$

With this, it can be seen that making the approximation $r_i(t) \approx W_i(t)/d_i(t)$ shows that the rate-based fluid-flow model of a TCP source is essentially equivalent to a window-based, nonlinear, fluid-flow TCP model.

Assuming a constant RTT $d_0$, rewrite the initial equation as:

$$f(r_i, r_{i,d}, p) = \dot{r}_i(t) = \frac{1}{d_0^2} - \theta r_i(t) r_{i,d}(t) p(t-d_0) \quad (2)$$

where $$r_{i,d}(t) = \dot{r}_i(t-d_0).$$

Using Taylor series expansion, the small-signal linerization of $$f(r_i, r_{i,d}, p) = \dot{r}_i(t)$$

about an operating point $(r_0, p_0)$ is given as $$\delta\dot{r}_i(t) = \left.\frac{\partial f}{\partial r_i}\right|_{r_0, p_0}\delta r_i(t) + \left.\frac{\partial f}{\partial r_{i,d}}\right|_{r_0, p_0}\delta r_{i,d}(t) + \left.\frac{\partial f}{\partial p}\right|_{r_0, p_0}\delta p(t-d_0) \quad (3)$$

where $$\delta r_i(t) = r_i(t) - r_0$$

$$\delta r_{i,d}(t) = r_{i,d}(t) - r_0$$

$$\delta p(t-d_0) = p(t-d_0) - p_0$$

and $$\left.\frac{\partial f}{\partial r_i}\right|_{r_0, p_0} = \left.\frac{\partial f}{\partial r_{i,d}}\right|_{r_0, p_0} = -\theta r_0 p_0$$

$$\left.\frac{\partial f}{\partial p}\right|_{r_0, p_0} = -\theta r_0^2$$

The linearized equation (3) then becomes $$\delta\dot{r}_i(t) = -\theta r_0 p_0 (\delta r_i(t) + \delta r_{i,d}(t)) - \theta r_0^2 \delta p(t-d_0). \quad (4)$$

Making the approximation $r_i(t) \approx r_{i,d}(t)$ in (4), it follows that $$\delta\dot{r}_i(t) = -2\theta r_0 p_0 \delta r_i(t) - \theta r_0^2 \delta p(t-d_0) \quad (5)$$

Assume that the link of capacity C is shared by a constant number N or TCP sources. The aggregate rate on the link R(t) is given by $$\sum_{i=1}^{N} r_i(t) = R(t). \quad (6)$$

From (6), the equilibrium point of the system can be expressed as $$\sum_{i=1}^{N} r_0 = R_0 = \rho C, \quad (7)$$

or $$r_0 = \frac{\rho C}{N}, \quad (8)$$

where $\rho \in (0,1]$ is a target utilization factor. From (1) and (8), the equilibrium point of the marking/dropping probability can be expressed as $$p_0 = \frac{1}{d_0^2 \theta r_0^2} = \frac{N^2}{\theta(d_0 \rho C)^2}. \quad (9)$$

Defining $\delta R(t) = R(t) - R_0$, it is known from (6) that $$\delta R(t) = \sum_{i=1}^{N} \delta r_i(t) \quad (10)$$

and $$\delta\dot{R}(t) = \sum_{i=1}^{N} \delta\dot{r}_i(t) \quad (11)$$

$$= -2\theta r_0 p_0 \sum_{i=1}^{N} \delta r_i(t) - \sum_{i=1}^{N} \theta r_0^2 \delta p(t-d_0)$$

-continued
$$= -2\theta r_0 p_0 \delta R(t) - N\theta r_0^2 \delta p(t-d_0)$$

Substituting the equilibrium points $(r_0, p_0)$ in (11), it follows that $$\delta \dot{R}(t) = -\frac{2N}{d_0^2 \rho C}\delta R(t) - \frac{\theta \rho^2 C^2}{N}\delta p(t-d_0) \quad (12)$$

or $$\frac{d_0^2 \rho C}{2N}\delta \dot{R}(t) = -\delta R(t) - \frac{\theta d_0^2 \rho^3 C^3}{2N^2}\delta p(t-d_0) \quad (13)$$

$$\tau \delta \dot{R}(t) + \delta R(t) = -k\delta p(t-d_0)$$

where $$\tau = \frac{d_0^2 \rho C}{2N}$$

and $$k = \frac{\theta d_0^2 \rho^3 C^3}{2N^2}.$$

Taking the Laplace transform of (13) it obtains that $$\tau s \mathfrak{R}(s) + \mathfrak{R}(s) = -ke^{-d_0 s}P(s), \quad (14)$$

where $\mathfrak{R}(s)$ is the Laplace transform of $\delta R(t)$ and $e^{-sd_0}P(s)$ is the Laplace transform of $\delta p(t-d_0)$.

The open-loop transfer function of the TCP/AQM plant may be obtained from (14) as $$G(s) = \frac{\mathfrak{R}(s)}{P(s)} = \frac{-ke^{-d_0 s}}{\tau s + 1}. \quad (15)$$

In (15), $-k$ represents the steady-state (or static) gain of the TCP/AQM plant, $d_0$ represents the time delay (or dead time), and $\tau$ represents the time constant of the plant.

Returning to FIG. 2 and noting again that Target Rate "T" 226 is the control target, Actual Rate "R" 222 is the output of the plant (actual traffic arrival rate), mark/drop probability threshold "p" 224 is the control input, TCP/AQM plant 210 given by (15) as the plant to be controlled, and C(s), the control-function means 220 is to be a integral controller.

The Laplace transform expression for the case of a integral controller may be written as:

$$C(s) = \frac{k_i}{s}, \quad (16)$$

where $k_i$ is integral gain of the controller.

The closed-loop transfer function of the TCP/AQM plant is then given as $$G_{AQM}(s) = \frac{C(s)G(s)}{1+C(s)G(s)} = \frac{-kk_i e^{-d_0 s}}{\tau s^2 + s - kk_i e^{-d_0 s}}. \quad (17)$$

The objective now is to determine the values of the parameter $k_i$ for which the closed-lop system is stable.

Using an extension of the Hermite-Biehler Theorem applicable to quasipolynomials a detailed analytical characterization of the stabilizing feedback gains of the closed-loop TCP/AQM system may be performed as follow.

The characteristic equation of a control system with time delay can be expressed in the general form as $$F(s) = d(s) + e^{-sT_1}n_1(s) + e^{-sT_2}n_2(s) + K + e^{-sT_m}n_m(s), \quad (18)$$

where $d(s)$, $n_i(s)$ for $i=1,2,K,m$ are polynomials with real coefficients.

Characteristic equations of the form (18) are also referred to as quasipolynomials. It can be shown that the Hermite-Biehler Theorem for Hurwitz polynomials does not carry over to arbitrary functions $f(s)$ of the complex variable s. However, a suitable extension of the Hermite-Biehler Theorem can be developed to study the stability of certain classes of quasipolynomials characterized as follows.

If the following assumptions are made in (18)

A1: $\deg[d(s)] = n$ and $\deg[n_i(s)] \leq n$ for $i=1,2,K,m$;

A2: $0 < T_1 < T_2 < K < T_m$, then instead of (18), one can consider the quasipolynomial $$F^*(s) = e^{sT_m}F(s) = e^{sT_m}d(s) + e^{s(T_m-T_1)}n_1(s) + e^{s(T_m-T_2)}n_2(s) + K + n_m(s). \quad (19)$$

Since $e^{sT_m}$ does not have any finite roots, the roots of F(s) are identical to those of F*(s). The quasipolynomial F*(s), however, has a principal term, i.e., the coefficient of the term containing the highest powers of s and $e^s$ is nonzero. It then follows that this quasipolynomial is either of the delay (i.e., retarded) or of the neutral type. From this, it follows that the stability of the system with characteristic equation (18) is equivalent to the condition that all the roots of F*(s) be in the open left-half plane. Equivalently, it can be stated that F*(s) is Hurwitz or stable. The theorem below gives necessary and sufficient conditions for the stability of F*(s):

Theorem 1: Let F*(s) be given by (19), and write $$F^*(j\omega) = F_r(\omega) + jF_i(\omega)$$

where $F_r(\omega)$ and $F_i(\omega)$ represent the real and imaginary parts of F*(s), respectively. Under assumptions A1 and A2, F*(s) is stable if and only if 1) $F_r(\omega)$ and $F_i(\omega)$ have only simple real roots and these interlace 2) $\dot{I}_i(\omega_0)F_r(\omega_0) - F_i(\omega_0)\dot{I}_r(\omega_0) > 0$, for some $\omega_0$ in $(-\infty, \infty)$;

where $\dot{I}_r(\omega)$ and $\dot{I}_i(\omega)$ denote the first derivative with respect to $\omega$ of $F_r(\omega)$ and $F_i(\omega)$, respectively.

Using this theorem, the set of all integral gains that stabilize the first-order TCP/AQM plant with time delay described by (15) may be characterized. A key step in applying Theorem 1 to check stability is to ensure that $F_r(\omega)$ and $F_i(\omega)$ have only real roots. Such a property can be ensured by using the following result:

Theorem 2: Let M and L denote the highest powers of s and $e^s$, respectively, in F*(s). Let $\eta$ be an appropriate constant such that the coefficients of the terms of highest degree in $F_r(\omega)$ and $F_i(\omega)$ do not vanish at $\omega = \eta$.

Then for the equations $F_r(\omega)=0$ or $F_i(\omega)=0$ to have only real roots, it is necessary and sufficient that in the intervals $$-2\iota\pi+\eta \leq \omega \leq 2\iota\pi+\eta, \ \iota=1,2,3,K$$

$F_r(\omega)$ or $F_i(\omega)$ have exactly $4lL+M$ real roots starting with a sufficiently large l.

It is now possible to determine analytically the region in the $k_i$ parameter space for which the closed-loop TCP/AQM plant is stable.

First analyze the system given by (17) without time delay, i.e., $d_0=0$. In this case, the closed-loop characteristic equation of the system is given by $$F(s)=\tau s^2+s-kk_i. \tag{20}$$

For this second-order polynomial, it can be determined necessary and sufficient conditions that the controller and the plant parameters have to satisfy to guarantee the stability of the delay-free, closed-loop system. Solving the characteristic equation (20) for the roots, it follows that $$s_{1,2} = \frac{-1 \pm \sqrt{1+4\tau kk_i}}{2\tau}. \tag{21}$$

Given that $r>0$ and $k>$ are always true for the TCP/AQM plant, the closed-loop delay-free system is stable for the following condition $$k_i<0. \tag{22}$$

Next, let us consider the case where the time delay of the plant model is greater than zero, i.e., $d_0>0$. The closed-loop characteristic equation of the system is then $$F(s)=-kk_i e^{-d_0 s}+(1+\sigma s)s. \tag{23}$$

It is necessary to determine the set of all stabilizing gains for the system.

In order to study the stability of the closed-loop system, it is necessary to determine if all the roots of (23) lie in the open left half plane. The presence of the exponential term $e^{-d_0 s}$ results in the number of roots of $F(s)$ being infinite and this makes the stability check very difficult. However, Theorem 1 can be invoked to determine the set of all stabilizing gains $k_i$. This procedure is explained as follows.

First consider the quasipolynomial $F^*(s)$ defined by $$F^*(s)=e^{d_0 s}F(s)=-kk_i+(1+\sigma s)s e^{d_0 s}. \tag{24}$$

Substituting $s=j\omega$, and using the relationship $e^{d_0 j\omega}=\cos(d_0\omega)+j\sin(d_0\omega)$, the following expression results $$F^*(j\omega)=F_r(\omega)+jF_i(\omega)$$

where $$F_r(\omega)=-kk_i-\omega\sin(d_0\omega)-\tau\omega^2\cos(d_0\omega)$$

$$F_i(\omega)=\omega[\cos(d_0\omega)-\tau\omega\sin(d_0\omega)]$$

For convenience of analysis, make the following change of variables, $z=d_0\omega$. Thus, it is possible to rewrite the real and imaginary parts of $F^*(j\omega)$ as $$F_r(z) = -kk_i \frac{1}{d_0}z\sin(z) - \frac{\tau}{d_0^2}z^2\cos(z) \tag{25}$$

$$F_i(z) = \frac{1}{d_0}z\cos(z) - \frac{\tau}{d_0^2}z^2\sin(z). \tag{26}$$

Theorem 1 requires a check of two conditions to ensure the stability of the quasipolynomial $F^*(s)$.

Check of Condition 2 of Theorem 1: First check if $$E(\omega_0)=\dot{I}_i(\omega_0)F_r(\omega_0)-F_i(\omega_0)\dot{I}_r(\omega_0)>0$$

for some $\omega_0$ in $(-\infty,\infty)$.

Taking $\omega_0=z_0=0$, for instance, gives $F_r(z_0)=-kk_i$ and $F_i(z_0)=0$. Also obtained is $$\dot{I}_r(z_0)=0$$

and $$(z) = \left(\frac{d_0-\tau z^2}{d_0^2}\right)\cos(z) - \left(\frac{2\tau+d_0}{d_0^2}\right)z\sin(z), \Rightarrow \dot{F}_i(z_0) = \frac{1}{d_0}.$$

From these it may be seen that $$E(z_0) = \left(\frac{1}{d_0}\right)(-kk_i).$$

Given that for the TCP/AQM plant the conditions $\tau>0$ and $k>0$ hold true, it is required that $F_r(z_0)=-kk_i>0$ (i.e., $k_i<0$) for $E(z_0)>0$. This result is consistent with that given in (22).

Check of Condition 1 of Theorem 1: Now check the interlacing of the roots of $F_r(z)$ and $R_i(z)$. The roots of the imaginary part, i.e., $F_i(z)=0$ can be determined from (26). This yields $$\frac{z}{d_0}\left[\cos(z) - \frac{\tau}{d_0}z\sin(z)\right] = 0.$$

It may be seen from this equation that $z=0$ is a root of $F_i(z)$, or $$\cot(z) = \frac{\tau}{d_0}z \tag{27}$$

Figure 3:
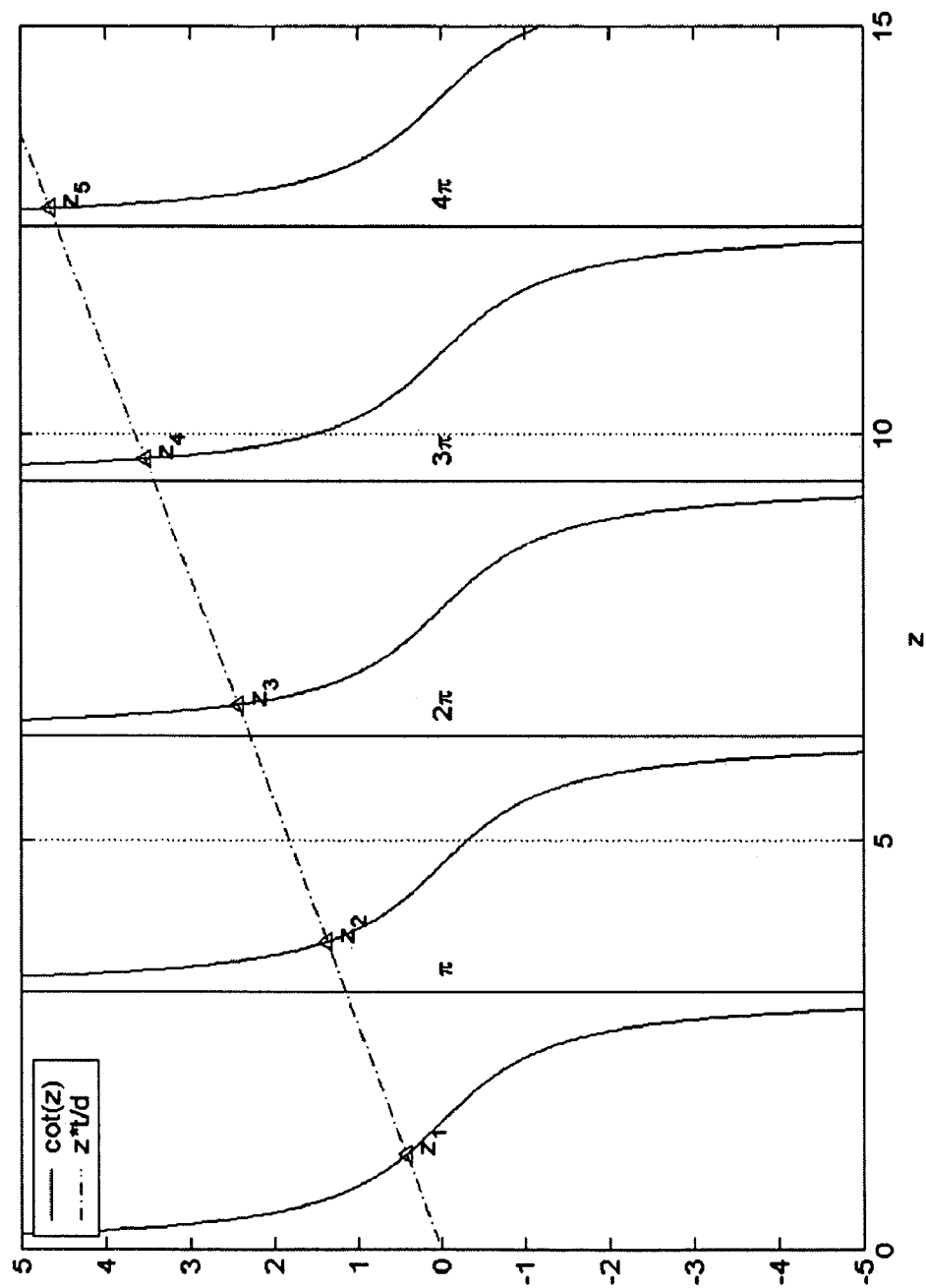
FIG. 3 is a plot of the two terms in Equation (27) for a general system.

One root of the imaginary part $F_i(z)$ is $z_0=0$ but the other roots are difficult to find and require an analytical solution of (27). However, a plot of the two terms in (27), $$\left(i.e., \ \cot(z) \text{ and } \frac{\tau}{d_0}z\right)$$

can be used to understand the nature of the real solution. It is possible to plot these two terms for arbitrarily selected values of k, $\tau$ and $d_0$. The general nature of the plots, however, does not change with the use of other values. Arranged in increasing order of magnitude, denote the positive real roots of (27) by $z_j$, $j=1,2,3,K$. Form FIG. 3, it may be clearly seen that the non-negative real roots of the imaginary part $F_i(z)$ satisfy $$z_1 \in \left(0, \frac{\pi}{2}\right), z_2 \in \left(\pi, \frac{3\pi}{2}\right), z_3 \in \left(2\pi, \frac{5\pi}{2}\right), z_4 \in \left(3\pi, \frac{7\pi}{2}\right), K \tag{28}$$

Theorem 2 may now be applied to check if $F_i(z)$ has only real roots. Substitute $s_1 = d_0 s$ in the expression for $F^*(s)$ (in (24)). It may now be seen that the new quasipolynomial in $s_1$ yields $M=2$ and $L=1$. Choose $$\eta = \frac{\pi}{4}$$

to satisfy the requirement that $F_i(z)$ does not vanish at $\omega = \eta$, i.e., $\sin(\eta) \neq 0$. From FIG. 3, it may be seen that in the interval $$\left[0, 2\pi - \frac{\pi}{4}\right] = \left[0, \frac{7\pi}{4}\right],$$

$F_i(z) = 0$ has 3 real roots including a root at the origin $z_0 = 0$. It is further apparent that $F_i(z)$ is an odd function. It therefore follows that in the interval $$\left[-\frac{7\pi}{4}, \frac{7\pi}{4}\right],$$

$F_i(z)$ will have 5 real roots. It is also possible to observe that $F_i(z)$ has one real root in $$\left(\frac{7\pi}{4}, \frac{9\pi}{4}\right].$$

Thus, $F_i(z)$ has $4L+M=6$ real roots in the interval $$\left[-2\pi + \frac{\pi}{4}, 2\pi + \frac{\pi}{4}\right].$$

Furthermore, $F_i(z)$ has 2 real roots in each of the intervals $$\left[2l\pi + \frac{\pi}{4}, 2(l+1)\pi + \frac{\pi}{4}\right]$$

and $$\left[-2(l+1)\pi + \frac{\pi}{4}, -2l\pi + \frac{\pi}{4}\right]$$

for $\iota = 1, 2, 3, K$. Hence it follows that $F_i(z)$ has exactly $4\iota L + M$ real roots in the interval $$\left[-2l\pi + \frac{\pi}{4}, 2l\pi + \frac{\pi}{4}\right]$$

for $\iota = 1, 2, 3, K$, which by Theorem 2 implies that $F_i(z)$ has only real roots.

$F_r(z)$ can now be evaluated at the roots of the imaginary part $F_i(z)$. For $z_0 = 0$, it was obtained previously $F_r(z_0) = -kk_i$. Now using (25), the following obtains for $z_j$, $j=1,2,3,K$, $$F_r(z_j) = -kk_i - \frac{1}{d_0} z_j \sin(z_j) - \frac{\tau}{d_0^2} z_j^2 \cos(z_j).$$

Using $$\frac{z}{d_0} = \frac{\cot(z)}{\tau}$$

from (27) in the above equation, it obtains that $$F_r(z_j) = -kk_i - \frac{\sin(z_j)\cot(z_j)}{\tau} - \frac{\tau}{d_0^2} z_j^2 \cos(z_j) \Rightarrow F_r(z_j) = \quad (29)$$

$$-kk_i - \frac{\tau}{d_0^2}\left[z_j^2 + \frac{d_0^2}{\tau^2}\right]\cos(z_j)$$

Therefore $$F_r(z_j) = -k[k_i + a(z_j)], \quad (30)$$

where $$a(z_j) = \frac{\tau}{kd_0^2}\left[z_j^2 + \frac{d_0^2}{\tau^2}\right]\cos(z_j). \quad (31)$$

From the previous results, $F_r(z_0) = -kk_i > 0$ (i.e., $k_i < 0$), then interlacing of the roots of $F_r(z)$ and $F_i(z)$ is equivalent to $F_r(z_1) < 0$, $F_r(z_2) > 0$, $F_r(z_3) < 0$, and so on. Using this fact, the result $F_r(z_0) = -kk_i > 0$ and equation (30), it may be seen that $$F_r(z_0) > 0 \Rightarrow k_i < 0$$

$$F_r(z_1) < 0 \Rightarrow k_i > -a(z_1) = a_1$$

$$F_r(z_2) > 0 \Rightarrow k_i < -a(z_2) = a_2$$

$$F_r(z_3) < 0 \Rightarrow k_i > -a(z_3) = a_3 \quad (32)$$

The following observations can now be made (noting that for the TCP/AQM plant the $\tau > 0$, $d_0 \geq 0$ and $k > 0$ hold true):

Observation 1: From (28), it is sen that $z_j$ for odd values of $j$ $(1, 3, 5, \ldots)$ are in the first quadrant. Thus, for odd values of $j$, $\cos(z_j) > 0$ and from (31), it may be concluded that $a(z_j) > 0$ for odd values of the parameter $j$.

Observation 2: Similarly, it is seen from (28) that $z_j$ for even values of $j$, $(2, 4, 6, \ldots)$ are in the third quadrant. Thus, for even values of $j$, $\cos(z_j) < 0$ and from (31), it follows that $a(z_j) < 0$ for even values of the parameter $j$.

All the set of inequalities obtained above can now be rewritten as $$\max_{j=1,3,5,K}\{a_j\} < k_i < \min_{j=0,2,4,6,K}\{a_j\}. \quad (33)$$

From (27) and the relationship $1+\tan^2(z_j)=\sec^2(z_j)$, it follows that $$\cos(z_j) = \pm\sqrt{\frac{1}{1+\tan^2(z_j)}} = \pm\frac{z_j}{\sqrt{z_j^2 + \frac{d_0^2}{\tau^2}}}. \quad (34)$$

From the foregoing analysis $z_j$, j=1,2,3,K are solutions of (27). Now using the above expression, it is possible to rewrite $a(z_j)$ defined in (31) as $$a(z_j) = \pm\frac{\tau}{kd_0^2}z_j\sqrt{z_j^2 + \frac{d_0^2}{\tau^2}} \quad (35)$$

where according to Observations 1 and 2 above, the plus sign (+) is used for odd values of j, and the minus sign (−) is used for even values of j.

With (35), it is possible to make the following observation:

Observation 3: Since $z_1<z_2<z_3<z_4<K$, from (35) (and Observations 1 and 2), it is seen that $a(z_j)$ is a monotonically increasing function for odd values of j (1, 3, 5, . . . ), i.e., $a(z_1)<a(z_3)<a(z_5)<K$, and $a(z_j)$ is a monotonically decreasing function for even value of j (0, 2, 4, 6, . . . ), i.e., $a(z_0)>a(z_2)>a(z_4)>a(z_6)>K$.

It is also clear that $a(z_0)=0$, $z_0=0$.

From this observation, the bounds for $k_i$ in (33) can now be expressed as $$-a(z_1) < k_i < 0, z_1 \in \left(0, \frac{\pi}{2}\right). \quad (36)$$

Therefore, for the interlacing property to hold it must be that $$-\frac{\tau}{kd_0^2}z_1\sqrt{z_1^2 + \frac{d_0^2}{\tau^2}} < k_i < 0, z_1 \in \left(0, \frac{\pi}{2}\right). \quad (37)$$

Note that for the values of $k_i$ in this range, the interlacing property and the fact that the root of $F_i(z)$ are all real can be used in Theorem 2 to guarantee that $F_r(z)$ also has only real roots. At this point, it is seen that all the conditions of Theorem 1 are satisfied.

Figure 4:
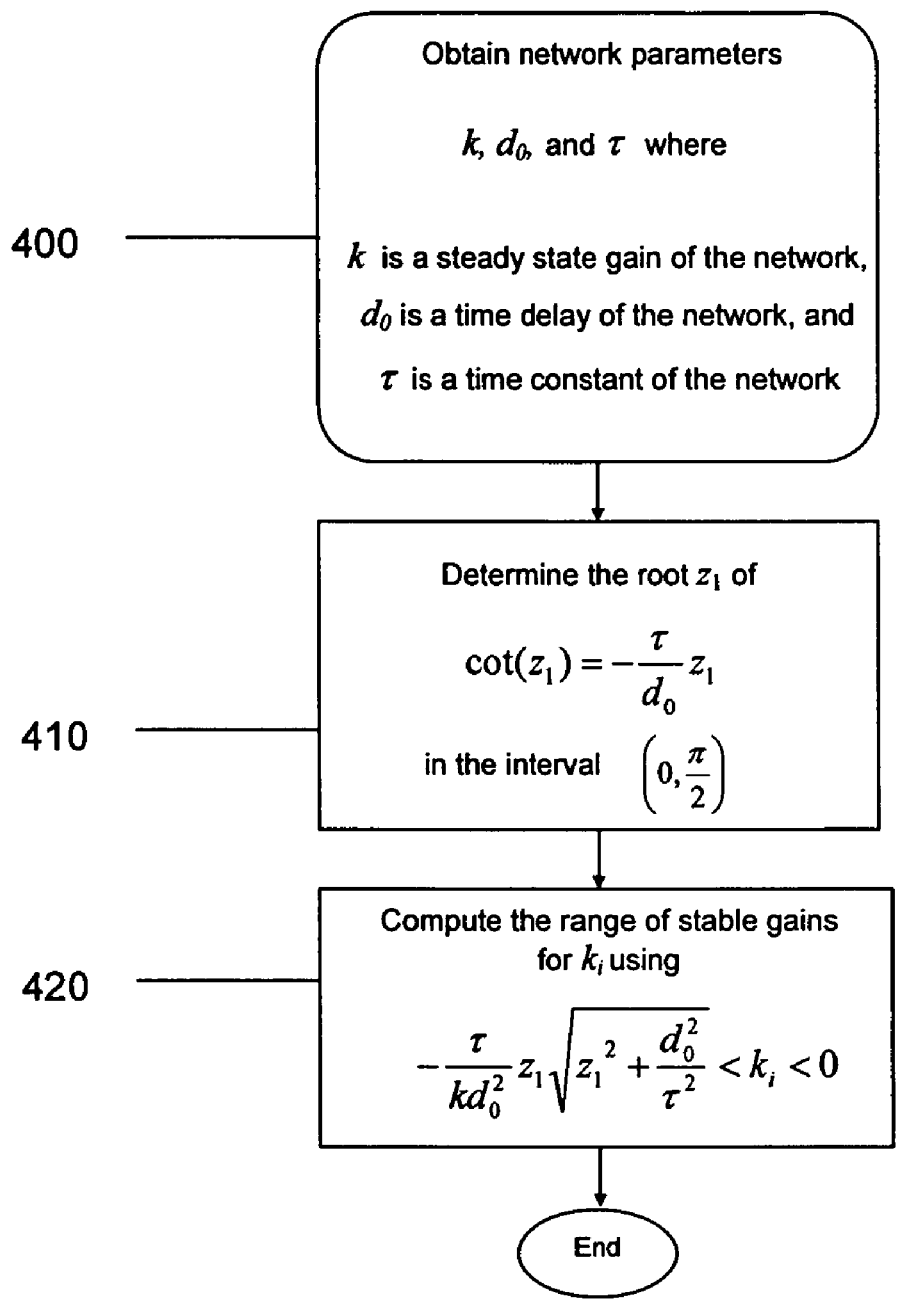
FIG. 4 is a block diagram of a routine for determining the stable integral gains for a closed-loop TCP/AQM system according to an embodiment of the invention.

It is possible to summarize the algorithm for determining the integral controller parameters as shown in FIG. 4. The process initiates, at step 400, by obtaining for a network a set of parameters k, $d_0$, and τ, where k is a steady-state gain of said network, $d_0$ is a time delay of said network, and τ is a time constant of said network. Next, at step 410, determining the root $z_1$ in the interval $$z_1 \in \left(0, \frac{\pi}{2}\right)$$

of $$\cot(z) = \frac{\tau}{d_0}z,$$

Next at step 420, computing the range of stable gains for $k_i$ for this particular network as $$-\frac{\tau}{kd_0^2}z_1\sqrt{z_1^2 + \frac{d_0^2}{\tau^2}} < k_i < 0.$$

As an example illustrating the use of the algorithm, consider the sample problem of characterizing the stabilizing integral controller gains for a TCP/AQM system with nominal operating parameters of T=ρC=45 Mbps, N=800, and $d_0$=55 m sec. We also select a small nominal packet size of 64 bytes which we use only for the computation of the stability region. A smaller packet size is selected for this purpose because of the fluid-flow model used in the TCP/AQM control problem. For this system k=1.0515×10$^6$ and τ=0.1652. Note that in deriving the control parameters, T is the control target and the TCP parameter θ=⅔. Following the procedure described in FIG. 4, computer $$z_1 \in \left(0, \frac{\pi}{2}\right)$$

satisfying (27) to obtain $z_1$=0.54583. From this, it is possible to obtain the range of stable $k_i$ gains as $-1.814\times10^{-5}<k_i<0$.

As a simple assessment of the region of gains obtained, the interlacing property and the system step response of a gain chosen from within the region may be examined. Set the controller gain $k_i$ (inside the stabilizing range) as $-1.5\times10^{-6}$.

With this value of $k_i$, the characteristic quasipolynomial of the system is given by $$F^*(s)=1.5773+(1+0.1652s)se^{d_0s}.$$

Substituting s=jω, it follows that $$F^*(j\omega)=[1.5773-\omega\sin(d_0\omega)-0.1652\omega^2\cos(d_0\omega)]+j[\omega\cos(d_0\omega)-0.1652\omega^2\sin(d_0\omega)]$$

Figure 5:
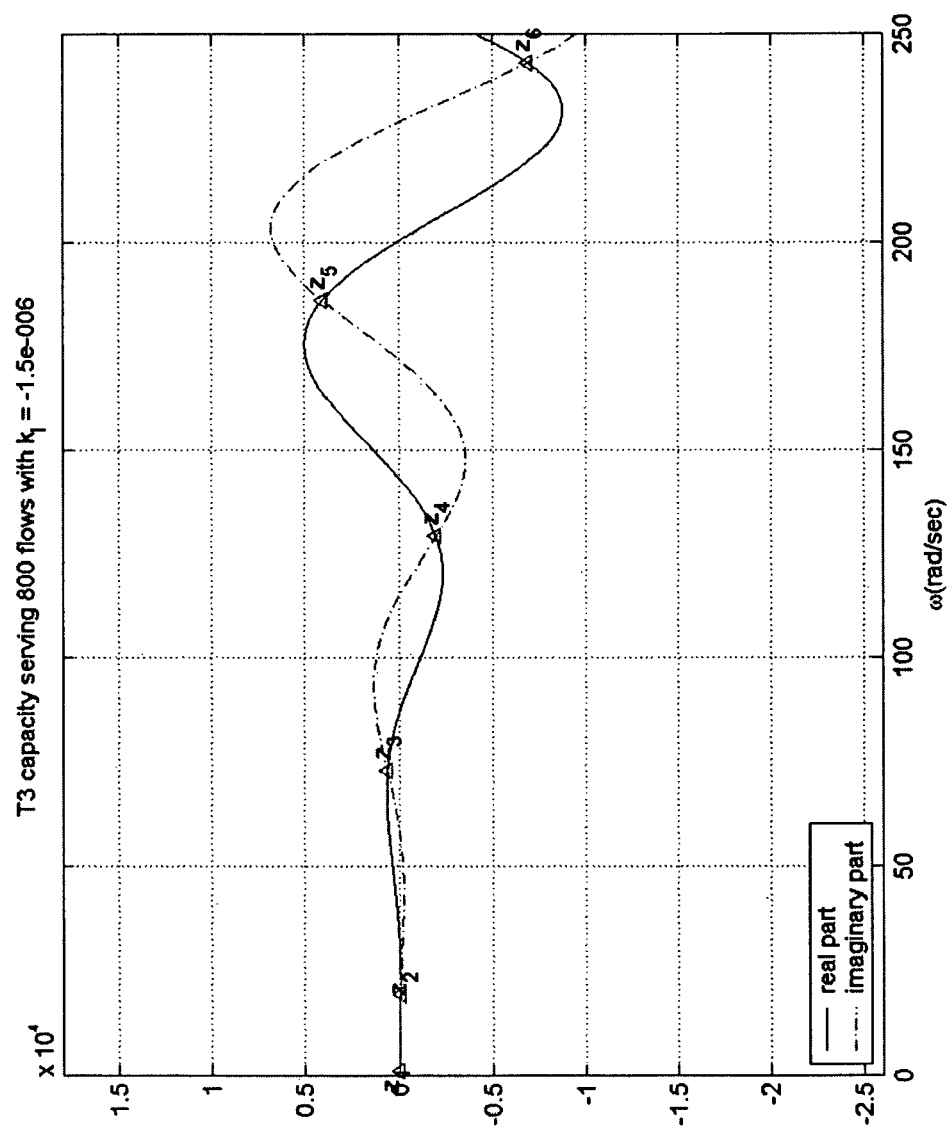
FIG. 5 is a plot of an example of the real and imaginary parts of $F^*(j\omega)$ according to an example embodiment of the invention.

FIG. 5 shows the plot of the real and imaginary parts of $F^*(j\omega)$. It can be observed that the real and imaginary parts interlace.

Figure 6:
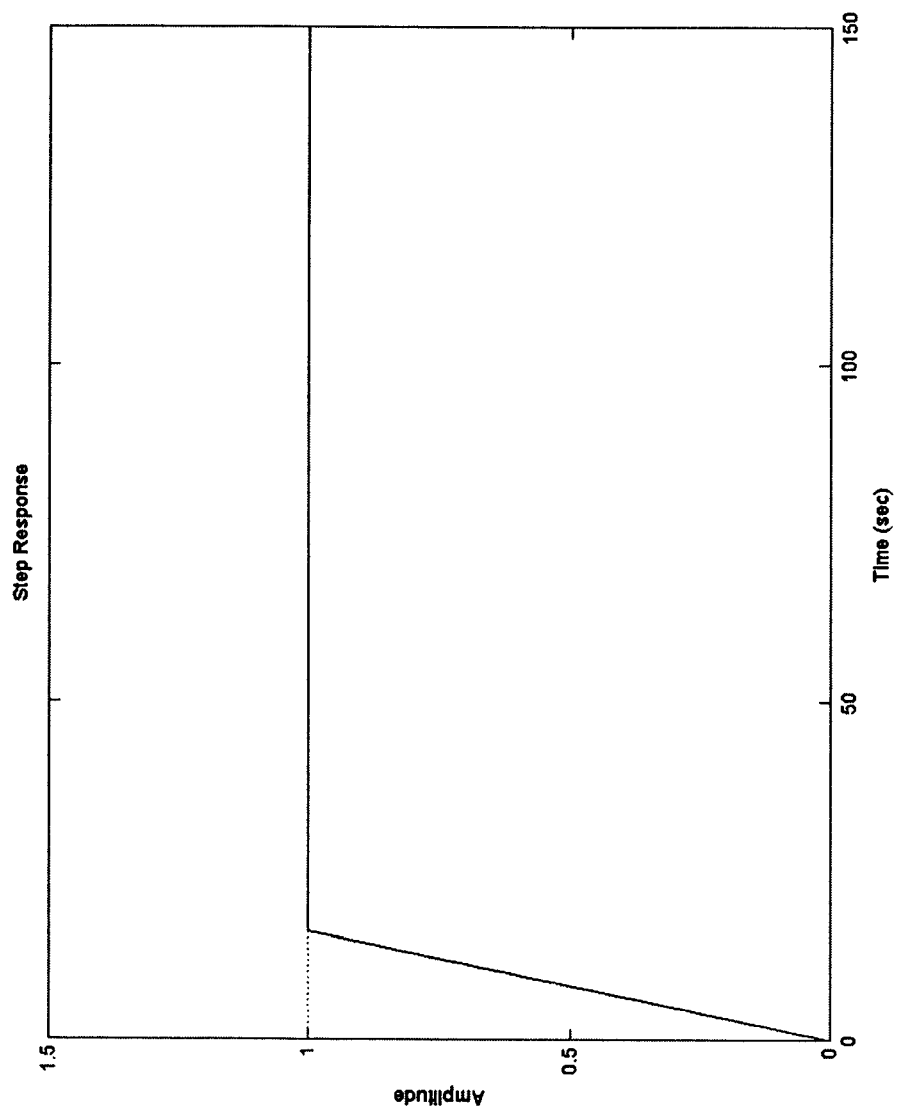
FIG. 6 is a plot of the step response of an example Integral Controller according to FIG. 2.

Further, it is possible to plot the resultant step response of the closed-loop TCP/AQM system as shown in FIG. 6. It can be seen from this figure that the closed-loop system is stable and the system output R(t) tracks the step input signal T(t).

Choosing which gain is most appropriate for a given system is a decision of the system engineer. Having available a range over which all gains are stable provides the advantage to the system engineer of being able to emphasize whichever aspect of controller performance is most desired, while at the same time ensuring that the system performance remains within bounds.

Once the stabilizing integral controller gains have been determined (based upon a TCP/AQM model using small nominal packet size, e.g., 64-byte packets), the integral control algorithm can easily be constructed. The integral controller output is given in the s-domain as $$P_i(s) = C_i(s) \cdot E(s) = \frac{k_I}{s} \cdot E(s).$$

where E(s) is the Laplace transform of the control error e(t)=T−R(t).

Denoting $t_m$, m=1,2,3,K as the sampling instants (i.e., the times the controller reads the input values), then in the continuous-time domain, the controller output is given as $$p_i(t) = k_i \int_0^t e(h)\,dh$$

It follows that $$\frac{dp_i(t)}{dt} = k_i e(t).$$

If this derivative is approximated by the backward difference, the following discrete-time approximation may be obtained $$\frac{p_i(t_m) - p_i(t_{m-1})}{\Delta t} = k_i e(t_m),$$

where $\Delta t = t_m - t_{m-1}$, m=1,2,3, K is the sampling interval.

This leads to the following recursive equation for the I-controller $$p_i(t_m) = p_i(t_{m-1}) + k_i \Delta t e(t_m).$$

Figure 7:
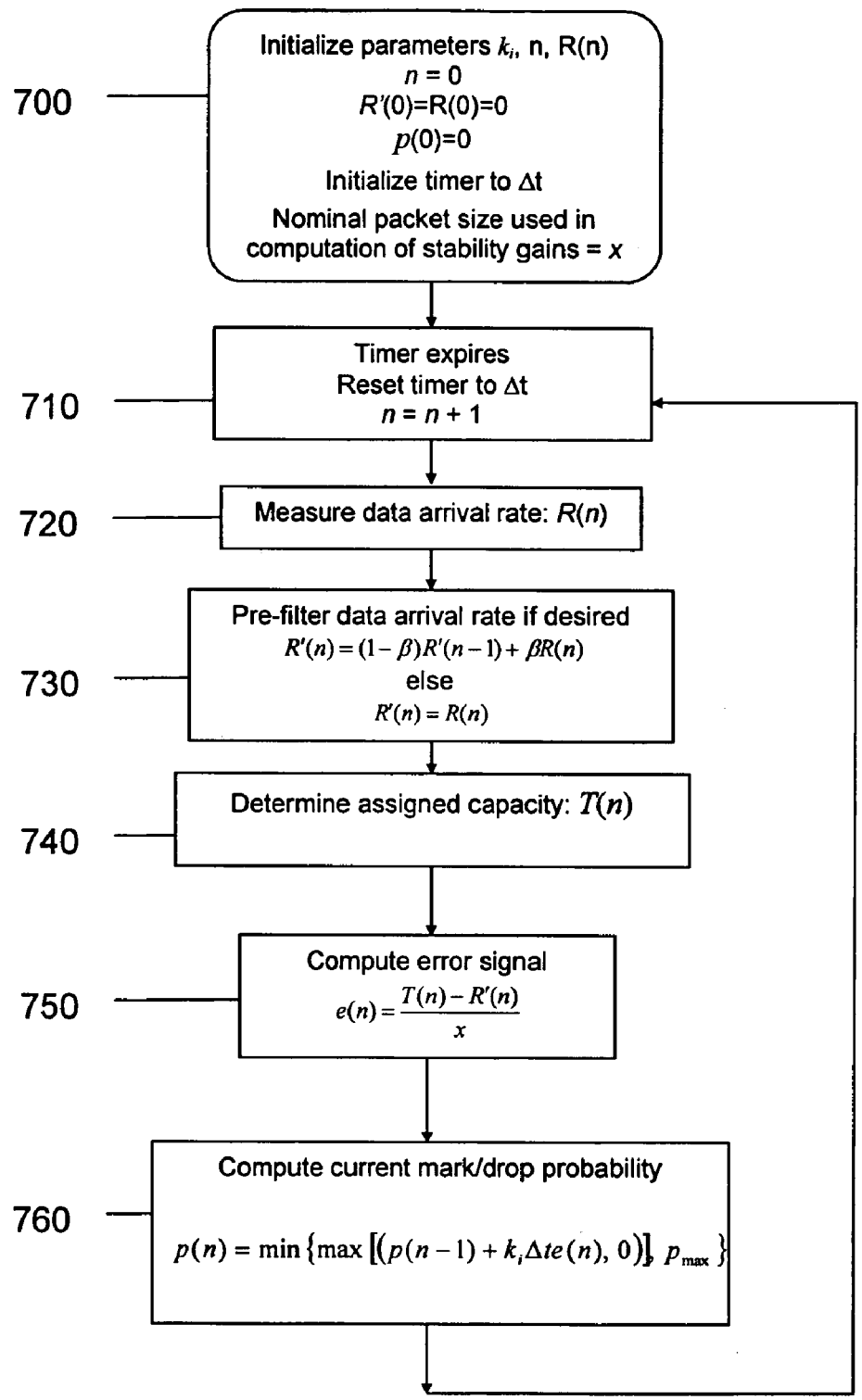
FIG. 7 is a block diagram of a mark/drop probability computation routine according to an embodiment of the invention.
Figure 8:
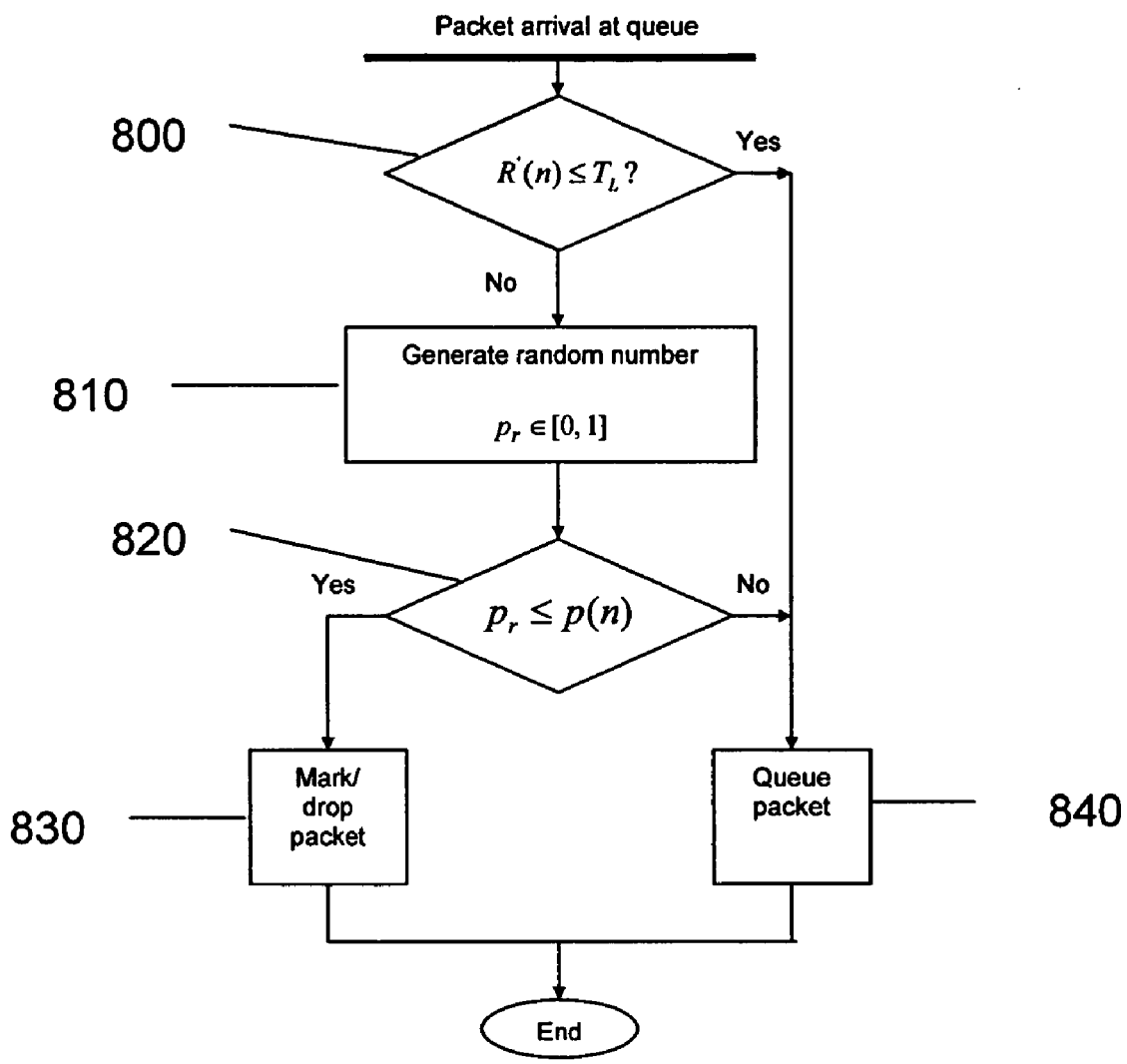
FIG. 8 is a block diagram of packet drop/mark routine according to an embodiment of the invention.

A flow chart for the control algorithm and the packet mark/drop routine are shown in FIG. 7 and FIG. 8. In the figures, the discrete sampling instants are simply represented as n=0Δt,1Δt,2Δt,3Δt,K. Note that no packet marking/dropping takes place when $R(t) \leq T_L$ in FIG. 8. The parameter $T_L$ rate threshold is simply a threshold lower than or equal to the control target T during which no packets are marked/dropped even though the mark/drop probability p(t) can be grater than zero. This simple mechanism helps to further minimize oscillations in link utilization and keep the utilization around the control target. Given that the models used in the design of the control system are approximations of the real TCP/AQM plant (i.e., neglect TCP slow start, timeouts), additional mechanisms may be useful to enhance the performance.

It is also important to note that rate measurements are usually noisy and as a result will require some low-pass filtering. A simple exponentially weighted moving average (EWMA) filter, for example, can be used for this. The EWMA filter can be expressed as $$R'(t_m) = (1-\beta) R'(t_{m-1}) + \beta R(t_m), \quad 0 < \beta < 1.$$

As shown in FIG. 7 the process initiates, at step 700, at discrete time n=0, by initializing certain parameters. The timer is set to Δt time units, and mark/drop probability ρ(0), and Rate signal R(0) are set to initial values. The initial mark/drop probability is used in the mark/drop routine until further samples are available. A nominal packet size of x is also chosen at step 700. At step 710, the timer is reset to Δt time units to advance to the next discrete time interval. Then at step 720, the data arrival rate R is measured.

At step 730, there is an optional step of pre-filtering the data arrival rate as described previously.

At step 740, the assigned capacity is determined. Typically, this is a given for a particular network configuration but may vary as circumstances warrant, for example, if the network is modified.

At step 750, an error signal e(n) is calculated as the difference between the assigned capacity and the measured (and possibly filtered) data arrival rate. The error signal is normalized by the nominal packet size x so that the measurements R and T will be consistent with the packet size x used in the computations of the stability gain.

At step 760, a current mark/drop probability p(n) is calculated as per an integral controller using the stable gain $k_i$ established at step 700.

The mark/drop probability calculated at step 760 may be used as the mark/drop probability until the next measurement time as tracked by the timer, at which point a new mark/drop probability will be calculated. In addition, the filtered arrival rate R'(n), if filtering is used, is stored to be used at the next measurement time.

The process may then loop back to step 710 upon timer expiration for another iteration of the process.

FIG. 8 presents a flowchart of a random number generator mark/drop routine. The decision to accept or mark/drop an incoming packet in the routine is based upon the outcome of a comparison of a randomly generated number $p_r \in [0,1]$ and the mark/drop probability p(n). The procedure can be described as follows.

Upon a packet arrival at the queue, at step 800, a determination is made whether the arrival rate is less than or equal to a no-mark/drop rate threshold. If the rate is less than or equal to the rate threshold, then the incoming packet is queued at step 840. If the rate is not less than or equal the rate threshold, then the routine moves to step 810 where a random number $p_r \in [0,1]$ is generated. At step 820, a determination of whether the random number $p_r$ is less than or equal to the calculated mark/drop probability p(n) is made.

If the probability $p_r$ is less than or equal, then the packet is marked/dropped at step 830. If not, the packet is queued at step 840.

Note that the rate measurements (R(t) and the target rate T) can be done in bytes or bits per second. The error signal, however, has to be normalized by the (small) nominal packet size used in the computing of $k_i$.

A network node using the above rate-based AQM mechanism is able to provide high network utilization, absorb transient traffic bursts, while maintaining small queues. Following is a description of an enhanced algorithm which retains all the features of the basic algorithm in addition to the ability to drop low-precedence packets in preference to higher precedence packets.

The enhanced algorithm consists of multiple instances of the basic algorithm. Each instance is associated with a precedence grade. A precedence grade is a traffic type having an associated priority. An example precedence grading scheme is that of the green-yellow-red color schema. Each instance (one for each priority or color) will be controlling traffic in a single queue but with the instances having different rate congestion indicators and thresholds. As an example of the enhanced algorithm applied to a case of three precedence grades, the following parameters are defined:

Three rate measurements (used as congestion indicators), one for each color, c∈{g=green, y=yellow, r=red}, with green packets having higher precedence than red or yellow packets, and yellow packets having higher precedence than red packets:

$R_g$ & rate of only green packets to the aggregate queue $R_y$ & rate of both yellow and green packets to the aggregate queue $R_r$ & rate of all packets (of all colors) to the aggregate queue Especially note that the rate for a particular color or precedence grade is not the specific rate of the packets having that color, but for the purposes here is the combined rate of the rate of the packets of that color summed with the rates of the packets of higher precedence grade. Thus, $R_g$ being the rate of the highest precedence grade, is solely the rate of the green packets whereas $R_y$ is the sum of the rates of the yellow packets plus rate of the green packets, the green packets being of higher precedence grade than the yellow. The same relation holds for the case of other than three precedence grades.

Long-term averages of these rates are maintained as $\hat{R}_g$, $\hat{R}_y$, and $\hat{R}_r$, respectively.

Figure 9:
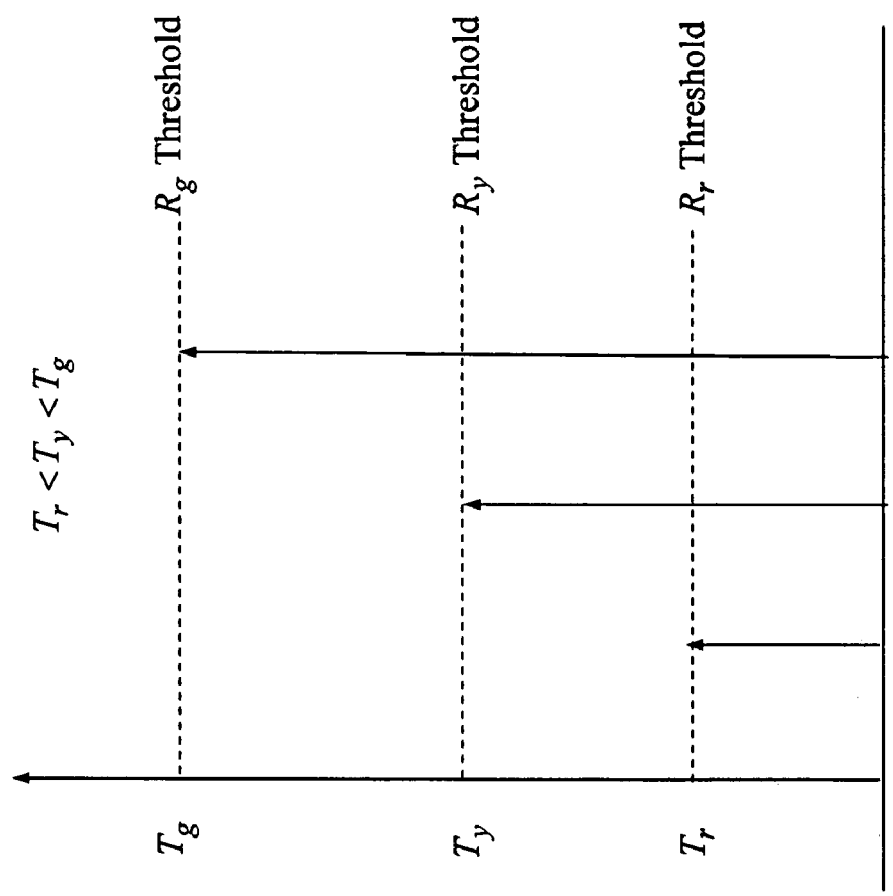
FIG. 9 is a plot of the relative relationship of three rate thresholds according to an embodiment of the invention.

Three rates thresholds capacities, one for each color, $T_c$, $c \in \{g,y,r\}$, as illustrated in FIG. 9.

Three no-drop thresholds, one for each color, $T_{L,c}$, $c \in \{g,y,r\}$

Figure 10:
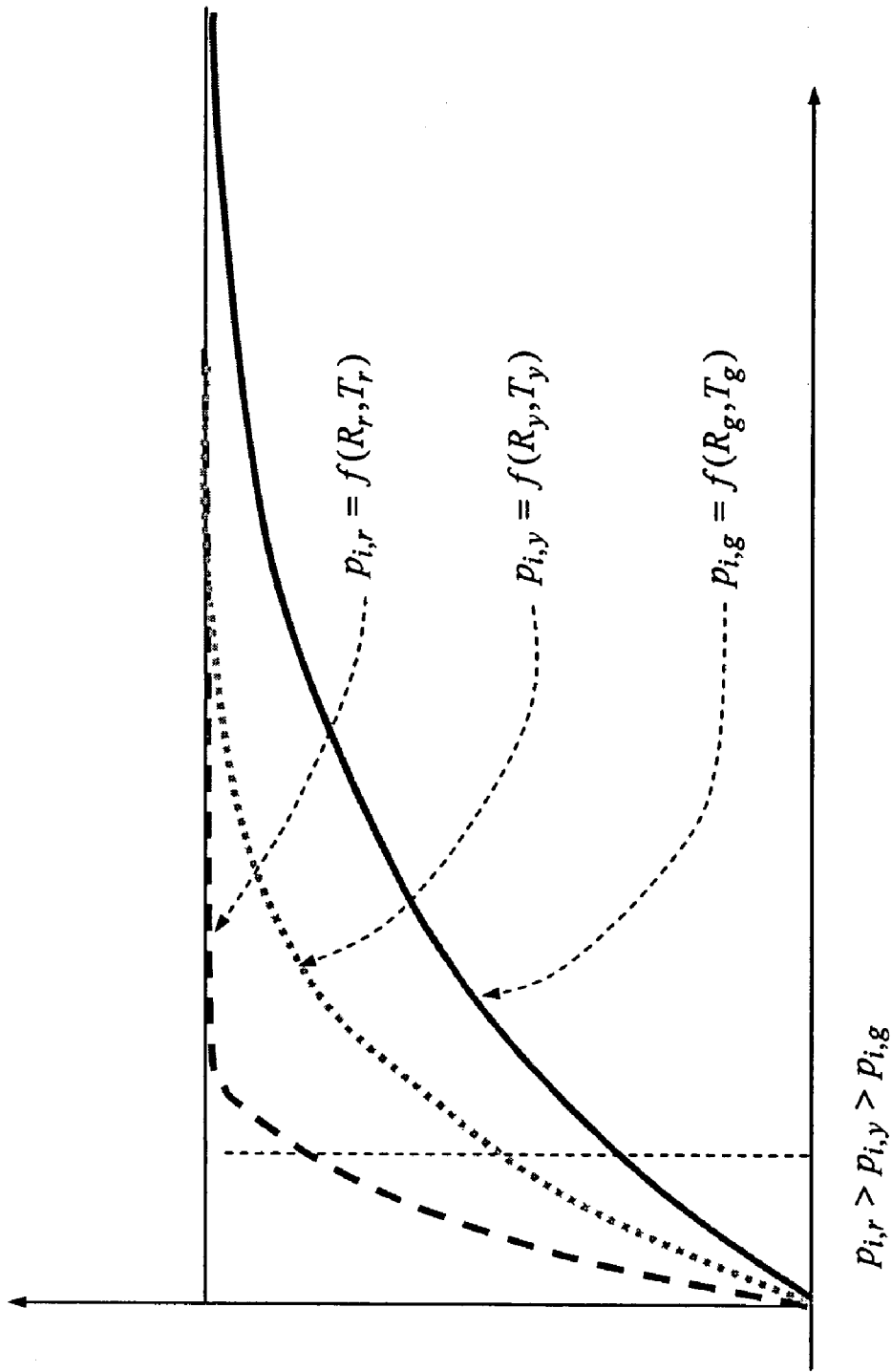
FIG. 10 is a plot of the relative relationship of three drop probabilities according to an embodiment of the invention.

Three drop probability computations, one for each color, $p_{i,c}$, $c \in \{g,y,r\}$ $p_{i,c}(n)=p_{i,c}(n-1)+k_i \Delta t e_c(n)$, $c \in \{g,y,r\}$ The enhanced algorithm operates such that under sustained congestion (where traffic of all color are sent to the queue), the drop probabilities $p_{i,g}$, $p_{i,y}$ and $p_{i,r}$ will increase relative to each other as shown in FIG. 10. At any given instant during the congestion, the drop probabilities will generally be $p_{i,g}<p_{i,y}<p_{i,r}$.

Figure 11:
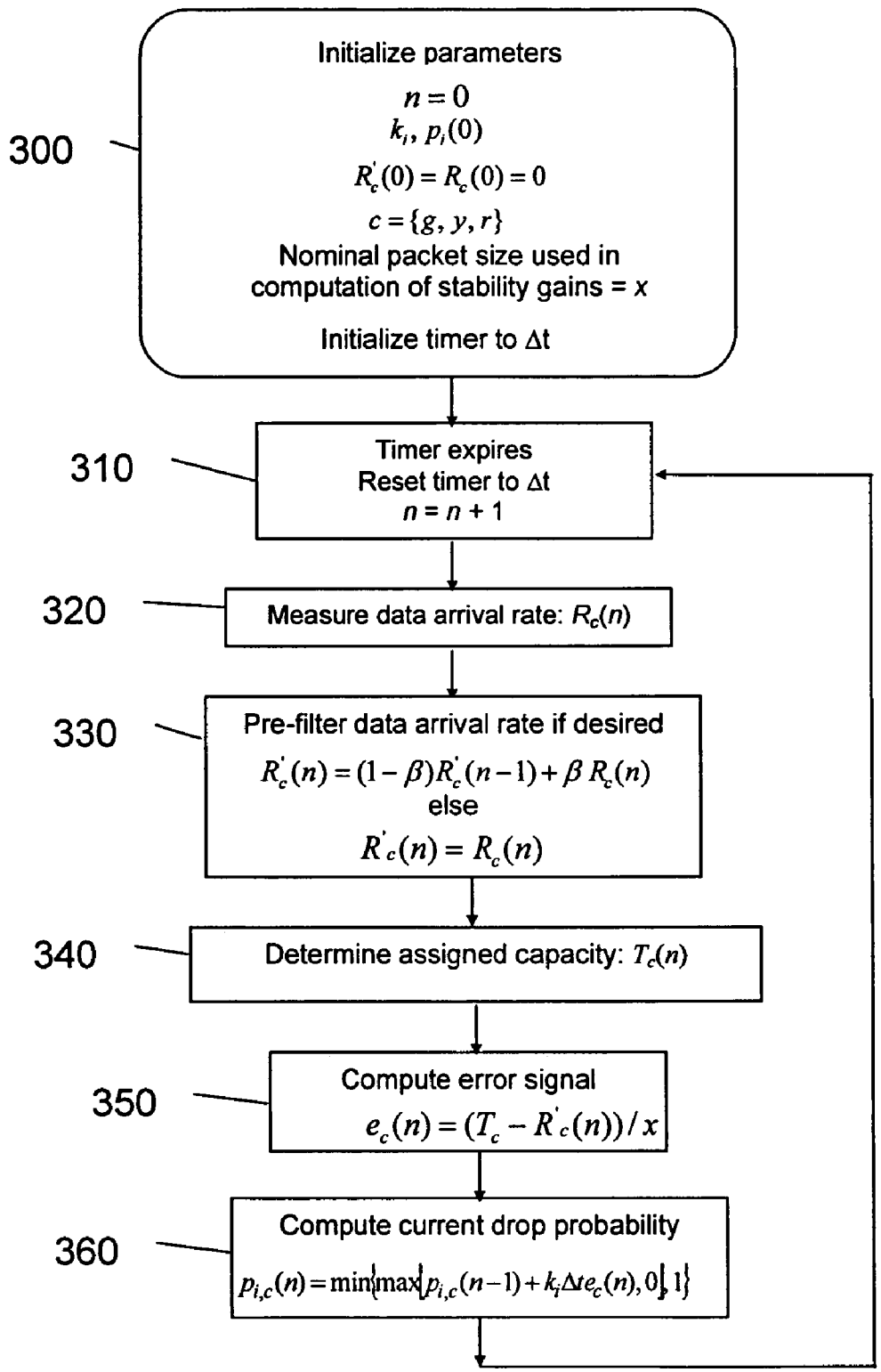
FIG. 11 is a block diagram of a three threshold mark/drop probability computation according to an embodiment of the invention.

The drop probabilities are computed as shown in FIG. 11. The process initiates, at step 300, at discrete time n=0, by initializing certain parameters. The timer is set to $\Delta t$ time units, and mark/drop probability $p(0)$, and Rate signal $R_c(0)$ are set to initial values. Note that there is a Rate signal $R_c$ for each of the colors (precedence grades). An integral controller gain $k_i$ is specified. The initial mark/drop probability is used in the mark/drop routine until further samples are available. A nominal packet size of x is also chosen at step 300.

At step 310, the timer is reset to $\Delta t$ time units to advance to the next discrete time interval. Then at step 320, the data arrival rate $R_c$ is measured appropriate to a particular color.

At step 330, there is an optional step of pre-filtering the data arrival rate as described previously.

At step 340, the assigned capacity for the color under consideration is determined. Typically this is a given for a particular network configuration but may vary as circumstances warrant, for example, if the network is modified.

At step 350, an error signal $e_c(n)$ is calculated as the difference between the assigned capacity and the measured (and possibly filtered) data arrival rate for that color. The error signal is normalized by the nominal packet size x so that $T_c$ and the measurement $R_c$ will be consistent with the packet size x used in the computations of the stability gain.

At step 360, a current mark/drop probability $p_{i,c}(n)$ is calculated as per an integral controller using the stable gain $k_i$ established at step 300.

The mark/drop probability calculated at step 360 may be used as the mark/drop probability until the next measurement time as tracked by the timer, at which point a new mark/drop probability will be calculated. If filtering is used, the filtered arrival rate $\hat{R}_c(n)$ is stored to be used at the next measurement time.

The process may then loop back to step 310 upon timer expiration for another iteratin of the process.

Figure 12:
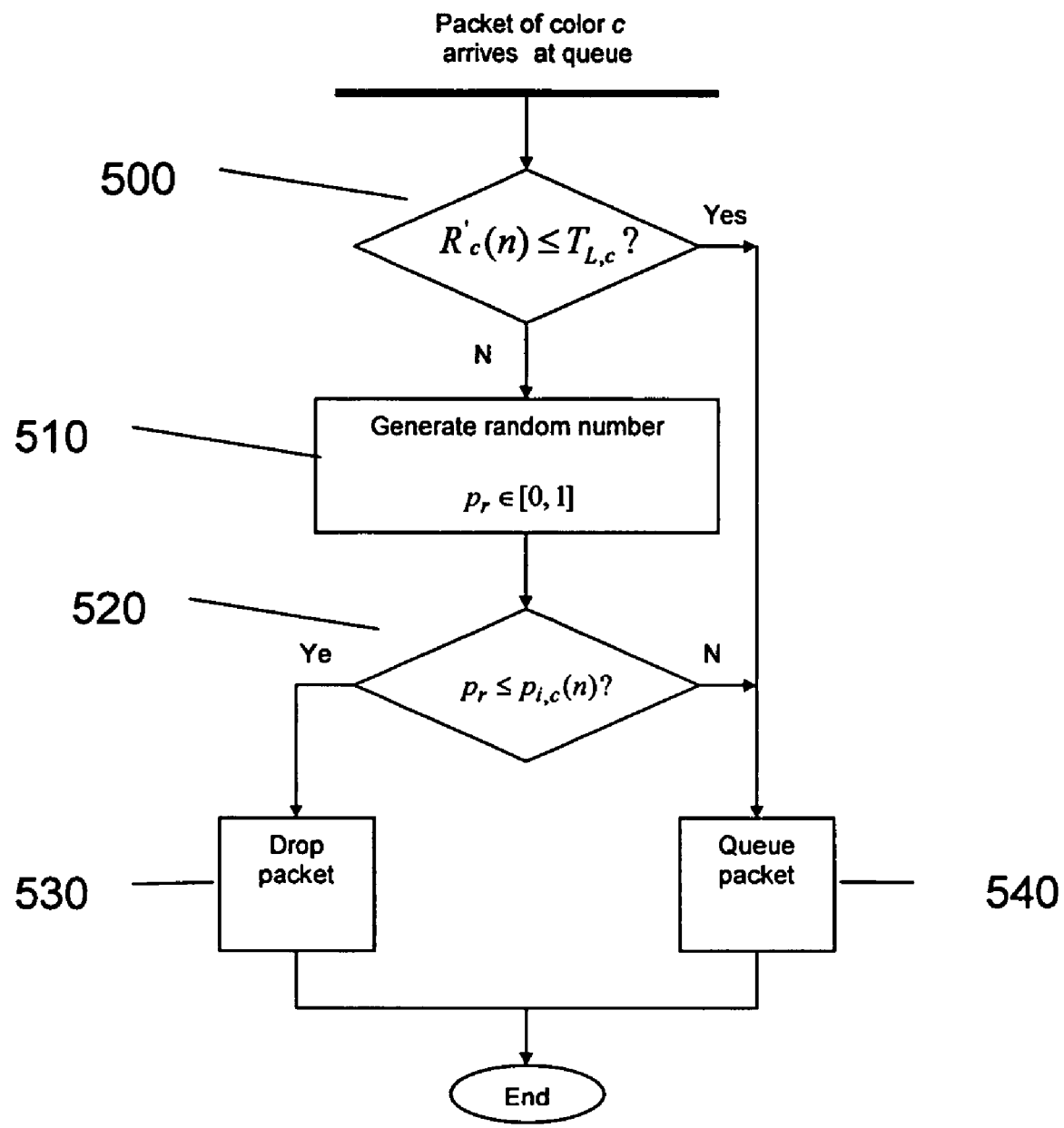
FIG. 12 is a block diagram of a multiple precedence grade packet mark/drop routine according to an embodiment of the invention.

FIG. 12 illustrates the packet drop routine for packets arriving at the queue. Given that under sustained traffic with all colors, it can be seen that $R_g<R_y<R_r$ and given that $T_g>T_y>T_r$, generally, red packets are dropped the most and green packets are dropped the least. Green packets are dropped only under severe congestion. The decision to accept or mark/drop an incoming packet in the routine is based upon the outcome of a comparison of a randomly generated number $p_r \in [0,1]$ and the mark/drop probability $p(n)$. The procedure can be described as follows.

Upon a packet arrival at the queue, at step 500, a determination is made whether the arrival rate for that color (precedence grade) $R_c(n)$ is less than or equal to a corresponding no-mark/drop rate threshold $T_{L,c}$ for that color. If the rate is less than or equal to the rate threshold, then the incoming packet is queued at step 540.

If the rate is not less than or equal the rate threshold, then the routine moves to step 510 where a random number $p_r \in [0,1]$ is generated.

At step 520 a determination of whether the random number $p_r$ is less than or equal to the calculated mark/drop probability $p_{i,c}(n)$ is made.

If the probability $p_r$ is less than or equal $p_{i,c}(n)$, then the packet is marked/dropped at step 530. If not, the packet is queued at step 540.

Note that the rate measurements ($R_c(n)$ and the target rate $T_c$) can be done in bytes or bits per second. The error signal, however, has to be normalized by the (small) nominal packet size used in the computing of $k_i$.

The example illustrated in FIGS. 9 to 13 illustrates the case for three precedence grades. An elaboration to a different quantity of grades is contemplated, such as a pair of grades where a simpler differentian of service is desired (e.g., high grade versus low grade) or, alternatively, a quantity higher than three where additional differentiation would provide for finer gradations.

In an alternative contemplated embodiment, a simplified set of thresholds is used. Specifically, applied to a case of three precedence grades, the following parameters are defined:

Three rate measurements (used as congestion indicators), one for each color, $c \in \{g=\text{green}, y=\text{yellow}, r=\text{red}\}$ $R_g$ & rate of only green packets to the aggregate queue $R_y$ & rate of both yellow and green packets to the aggregate queue $R_r$ & rate of all packets (of all colors) to the aggregate queue Long-term averages of these queue sizes are maintained as $\hat{R}_g$, $\hat{R}_y$, and $\hat{R}_r$, respectively.

Figure 13:
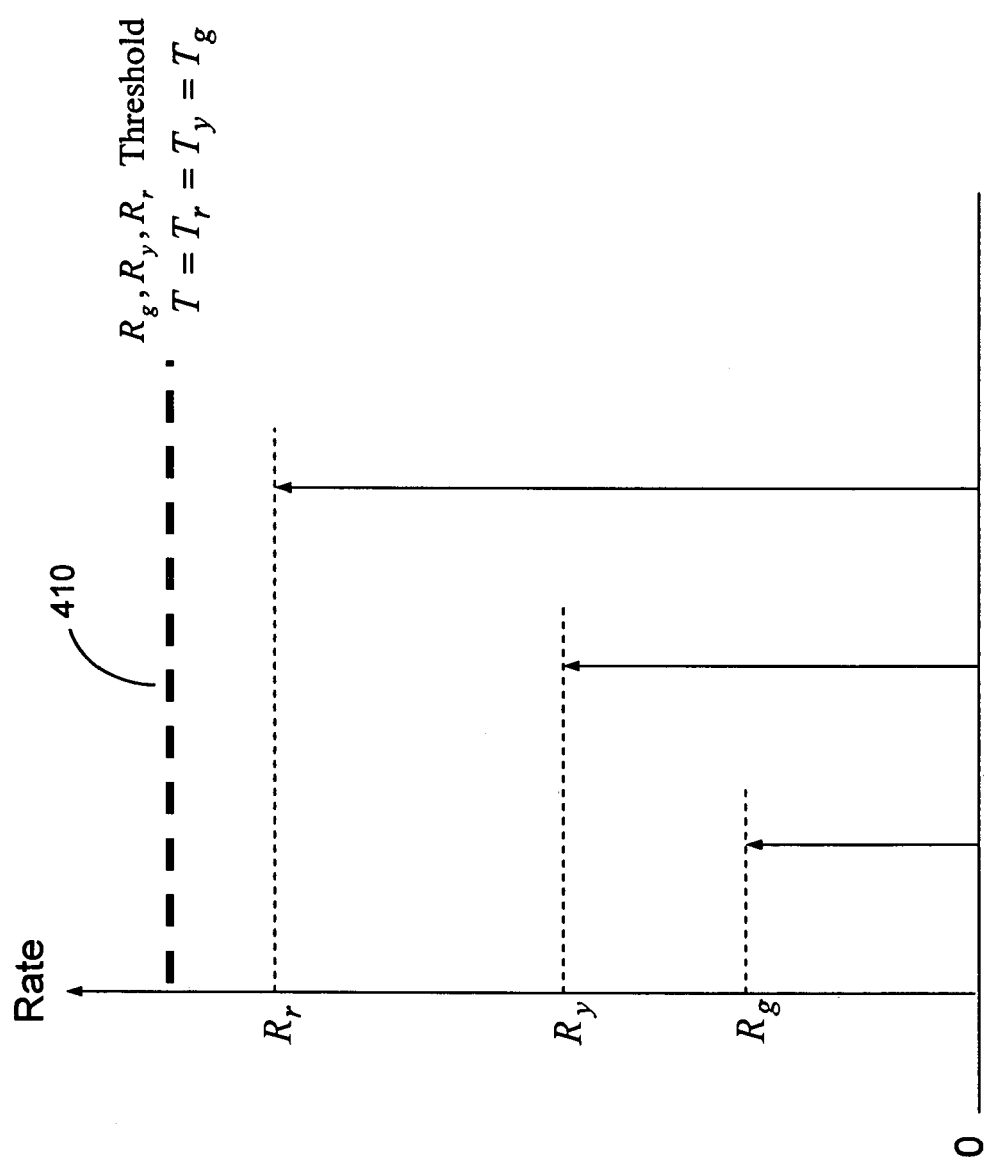
FIG. 13 is a plot of the relative relationship of three rates relative to a single rate mark/drop threshold according to an embodiment of the invention.

One rate threshold capacity 410 for all colors, $T=T_c$, $c \in \{g,y,r\}$, as illustrated in FIG. 13

One no-drop threshold for all colors, $T_L=T_{L,c}$, $c \in \{g,y,r\}$

Three drop probability computations, one for each color, $p_{i,c}$, $c \in \{g,y,r\}$ $p_{i,c}(n)=p_{i,c}(n-1)+k_i \Delta t e_c(n)$, $c \in \{g,y,r\}$ As with the previous embodiment, the drop probabilities will increase relative to each other as shown in FIG. 10. At any given instant during the congestion, the drop probabilities will be $p_{i,g}<p_{i,y}<p_{i,r}$. Given that under sustained traffic with all colors, we have $R_g<R_y<R_r$ and given that $T_g=T_y=T_r$, generally, red packets are dropped the most and green packets are dropped the least. Green packets are dropped only under severe congestion. The user of a single threshold may serve to simplify the implementation over the multiple threshold variation.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method for controlling a data flow in a data network, the method comprising:

setting a stable integral controller gain $k_i$ for said data network;

specifying a plurality of precedence grades, each of said precedence grades having a priority associated thereto;

for each precedence grade, calculating a cumulative data arrival rate R(n) where R(n) is the sum of the data arrival rates for a particular precedence grade under consideration plus the data arrival rates of all precedence grades with a higher priority than said particular precedence grade under consideration;

for each precedence grade calculating a normalized error signal e(n), according to the relation $$e(n)=(T(n)-R(n))/x,$$

where T(n) is an assigned precedence grade capacity at time n, and x is a nominal packet size;

for each precedence grade computing a mark/drop probability p(n) according to the relation $$p(n)=\min\{\max[p(n-1)+k_i \cdot \Delta t \cdot e(n), 0], p_{max}\}$$

where $\Delta t$ is the time interval between a $(n-1)^{th}$ and the $n^{th}$ computation, and $0 < p_{max} \leq 1$; and for each precedence grade executing a packet mark/drop routine based upon the calculated mark/drop probability p(n).

2. The method of claim 1 wherein the number of precedence grades is three.

3. The method of claim 1 wherein the step of setting the stable integral controller gain $k_i$ for said data network is preceded by the step of pre-calculating a range within which all gains $k_i$ result in a stable gain.

4. The method of claim 3 wherein the step of pre-calculating the range within which all gains $k_i$ result in the stable gain for said data network is determined according to the method of:

obtaining for said network a value for said network a set of parameters k, $d_0$, and $\tau$,
  where k is a steady-state gain of said network,
  $d_0$ is a time delay of said network, and
  $\tau$ is a time constant of said network;

determining a $z_1$ in the interval $$\left(0, \frac{\pi}{2}\right)$$

satisfying $$\cot(z_1) = \frac{\tau}{d_0} z_1;$$

and computing a range of stable gains $k_i$ for said data network according to $$-\frac{\tau}{k d_0^2} z_1 \sqrt{z_1^2 + \frac{d_0^2}{\tau^2}} < k_i < 0.$$

5. The method of claim 1 wherein the step of for each precedence grade measuring the data arrival rate R(n) at time n further comprises:

filtering the data arrival rate R(n) according to the relation:

$$R'(n)=(1-\beta) \cdot R'(n-1)+\beta \cdot R(n)$$

where $\beta$ is a filter gain parameter such that $0<\beta<1$,
R'(n-1) is the filtered data arrival rate at time n-1,
R'(n) is the desired filtered data arrival rate at time n, and
R(n) is the cumulative data arrival rate at time n.

6. The method of claim 1 further comprising a step, preceding the step of for each precedence grade executing the packet mark/drop routine, of:

for each precedence grade testing the cumulative data arrival rate R(n) against a rate threshold $T_L$ specific to that precedence grade; and if the cumulative data arrival rate R(n) is below or equal to said rate threshold $T_L$ then bypassing the step of executing a packet mark/drop routine for that precedence grade.

7. The method of claim 1 further comprising a step, preceding the step of for each precedence grade executing the packet mark/drop routine, of:

for each precedence grade testing the cumulative data arrival rate R(n) against a rate threshold $T_L$ common to all precedence grades; and if the cumulative data arrival rate R(n) is below or equal to said rate threshold $T_L$ then bypassing the step of executing a packet mark/drop routine for that precedence grade.

8. The method of claim 1 wherein the step of executing the packet mark/drop routine further comprises marking/dropping packets according to a random number generator mark/drop scheme.

9. An apparatus for controlling a data flow in a data network, the apparatus comprising:

an integral controller having an integral controller gain $k_i$ setting for which the said network is stable;

a cumulative data rate calculator for calculating a cumulative data arrival rate R(n) associated with each of said plurality of precedence grades, wherein R(n) is the sum of the data arrival rates for a particular precedence grade under consideration plus the data arrival rates of all precedence grades with a higher priority than said particular precedence grade under consideration;

an error signal calculator for calculating a normalized error signal e(n) for each of said plurality of precedence grades according to the relation $$e(n)=(T(n)-R(n))/x,$$

where T(n) is an assigned precedence grade capacity at time n, and x is a nominal packet size;

a mark/drop probability processor for computing a mark/drop probability p(n) for each of said plurality of precedence grades according to the relation $$p(n) = \min \{\max [p(n-1) + k_i \cdot \Delta t \cdot e(n), 0], p_{max}\}$$

where $\Delta t$ is the time interval between a $(n-1)^{th}$ and the $n^{th}$ computation, and $0 < p_{max} \leq 1$; and a packet mark/drop module for executing a packet mark/drop routine based upon the calculated mark/drop probability p(n).

10. The apparatus of claim 9 wherein the number of precedence grades is three.

11. The apparatus of claim 9 wherein the integral controller gain $k_i$ setting for which the said network is stable is chosen from a pre-calculated range within which all gains $k_i$ are gains for which said network is stable.

12. The apparatus of claim 11 wherein the pre-calculated range within which all gains $k_i$ are gains for which said network is stable is determined according to the method of:

obtaining for said network a value for said network of a set of parameters k, $d_0$, and $\tau$, where k is a steady-state gin of said network, $d_0$ is a time delay of said network, and $\tau$ is a time constant of said network;

determining a $zZ_i$ in the interval $$\left(0, \frac{\pi}{2}\right)$$

satisfying $$\cot(z_1) = \frac{\tau}{d_0} z_1;$$

and computing a range of stable gains $k_i$ for said data network according to $$-\frac{\tau}{k d_0^2} z_1 \sqrt{z_1^2 + \frac{d_0^2}{\tau^2}} < k_i < 0.$$

13. The apparatus of claim 9 wherein the cumulative data rate calculator for measuring data arrival rate R(n) at time n further comprises:

a filter for filtering the data arrival rate R(n) according to the relation:

$$R'(n) = (1-\beta) \cdot R'(n-1) + \beta \cdot R(n)$$

where $\beta$ is a filter gain parameter such that $0 < \beta < 1$,

R'(n-1) is the filtered data arrival rate at time n-1,

R'(n) is the desired filtered data arrival rate at time n, and

R(n) is the cumulative data arrival rate at time n.

14. The apparatus of claim 9 further comprising:

a test module for testing the cumulative data arrival rate R(n) against a rate threshold $T_L$ specific to that precedence grade; configured such that if the cumulative data arrival rate R(n) is below or equal to said rate threshold $T_L$ then bypassing the packet mark/drop module for that precedence grade.

15. The apparatus of claim 9 further comprising:

a test module for testing the cumulative data arrival rate R(n) against a rate threshold $T_L$ common to all precedence grades; configured such that if the cumulative data arrival rate R(n) is below or equal to said rate threshold $T_L$ then bypassing the packet mark/drop module for that precedence grade.

16. The apparatus of claim 9 wherein the packet mark/drop module further comprises a random number generator drop scheme module.

17. A computer program product comprising a computer readable medium having stored thereon computer executable instructions for controlling a data flow in a data network, the computer executable instructions comprising:

instructions for setting a stable gain of a integral controller gain $k_i$ for said data network;

instructions for specifying a plurality of precedence grades, each of said precedence grades having a priority associated thereto;

instructions for calculating, for each precedence grade, a cumulative data arrival rate R(n) where R(n) is the sum of the data arrival rates for a particular precedence garde under consideration and the data arrival rates of all precedence grades with a higher priority than said particular precedence grade under consideration;

instructions for calculating, for each precedence grade, a normalized error signal e(n), according to the relation $$e(n) = (T(n) - R(n))/x,$$

where T(n) is an assigned precedence grade capacity at time n, and x is a nominal packet size;

instructions for computing, for each precedence grade, a mark/drop probability p(n) according to the relation $$p(n) = \min \{\max [p(n-1) + k_i \cdot \Delta t \cdot e(n), 0], p_{max}\}$$

where $\Delta t$ is the time interval between a $(n-1)^{th}$ and the $n^{th}$ computation, and $0 < p_{max} \leq 1$; and instructions for executing, for each precedence grade, a packet mark/drop routine based upon the calculated mark/drop probability p(n).

* * * * *